United States Patent
Fisher et al.

(10) Patent No.: US 8,793,205 B1
(45) Date of Patent: Jul. 29, 2014

(54) ROBOTIC LEARNING AND EVOLUTION APPARATUS

(71) Applicants: Dimitry Fisher, San Diego, CA (US); Eugene Izhikevich, San Diego, CA (US)

(72) Inventors: Dimitry Fisher, San Diego, CA (US); Eugene Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 142 days.

(21) Appl. No.: 13/623,826

(22) Filed: Sep. 20, 2012

(51) Int. Cl.
*G06N 3/00* (2006.01)
*G06N 99/00* (2010.01)

(52) U.S. Cl.
CPC .............. *G06N 3/008* (2013.01); *G06N 99/005* (2013.01)
USPC .............................................. 706/25; 706/45

(58) Field of Classification Search
None
See application file for complete search history.

(56) References Cited

U.S. PATENT DOCUMENTS

| | | | |
|---|---|---|---|
| 5,063,603 | A | 11/1991 | Burt |
| 5,355,435 | A | 10/1994 | DeYong |
| 5,638,359 | A | 6/1997 | Peltola |
| 5,673,367 | A | 9/1997 | Buckley |
| 5,875,108 | A | 2/1999 | Hoffberg |
| 6,009,418 | A | 12/1999 | Cooper |
| 6,014,653 | A | 1/2000 | Thaler |
| 6,458,157 | B1 | 10/2002 | Suaning |
| 6,545,705 | B1 | 4/2003 | Sigel |
| 6,545,708 | B1 | 4/2003 | Tamayama |
| 6,546,291 | B2 | 4/2003 | Merfeld |
| 6,581,046 | B1 | 6/2003 | Ahissar |
| 7,849,030 | B2 | 12/2010 | Ellingsworth |
| 8,015,130 | B2 | 9/2011 | Matsugu |
| 8,315,305 | B2 | 11/2012 | Petre |
| 8,467,623 | B2 | 6/2013 | Izhikevich |
| 2002/0038294 | A1 | 3/2002 | Matsugu |
| 2003/0050903 | A1 | 3/2003 | Liaw |
| 2004/0193670 | A1 | 9/2004 | Langan |

(Continued)

FOREIGN PATENT DOCUMENTS

| | | |
|---|---|---|
| CN | 102226740 | 10/2011 |
| JP | 4087423 | 3/1992 |
| RU | 2108612 | 10/1998 |
| WO | 2008083335 | 7/2008 |

OTHER PUBLICATIONS

Tank, et al., Neural computation by concentrating information in time, Proc. Nati. Acad. Sci. USA, vol. 84, Apr. 1987, pp. 1896-1900.*

(Continued)

*Primary Examiner* — Wilbert L Starks
(74) *Attorney, Agent, or Firm* — Pillsbury Winthrop Shaw Pittman LLP

(57) ABSTRACT

Apparatus and methods for implementing robotic learning and evolution. An ecosystem of robots may comprise robotic devices of one or more types utilizing artificial neuron networks for implementing learning of new traits. A number of robots of one or more species may be contained in an enclosed environment. The robots may interact with objects within the environment and with one another, while being observed by the human audience. In one or more implementations, the robots may be configured to 'reproduce' via duplication, copy, merge, and/or modification of robotic. The replication process may employ mutations. Probability of reproduction of the individual robots may be determined based on the robot's success in whatever function trait or behavior is desired. User-driven evolution of robotic species may enable development of a wide variety of new and/or improved functionality and provide entertainment and educational value for users.

20 Claims, 15 Drawing Sheets

(56) References Cited

U.S. PATENT DOCUMENTS

| | | |
|---|---|---|
| 2005/0015351 A1 | 1/2005 | Nugent |
| 2005/0036649 A1 | 2/2005 | Yokono |
| 2005/0283450 A1 | 12/2005 | Matsugu |
| 2006/0161218 A1 | 7/2006 | Danilov |
| 2007/0176643 A1 | 8/2007 | Nugent |
| 2007/0208678 A1 | 9/2007 | Matsugu |
| 2009/0043722 A1 | 2/2009 | Nugent |
| 2009/0287624 A1 | 11/2009 | Rouat |
| 2010/0086171 A1 | 4/2010 | Lapstun |
| 2010/0166320 A1 | 7/2010 | Paquier |
| 2011/0016071 A1 | 1/2011 | Guillen |
| 2011/0119214 A1 | 5/2011 | Breitwisch |
| 2011/0119215 A1 | 5/2011 | Elmegreen et al. |
| 2012/0011090 A1 | 1/2012 | Tang |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0073491 A1 | 3/2013 | Izhikevich |
| 2013/0073496 A1 | 3/2013 | Szatmary |
| 2013/0073500 A1 | 3/2013 | Szatmary |
| 2013/0151450 A1 | 6/2013 | Ponulak |
| 2013/0218821 A1 | 8/2013 | Szatmary |
| 2013/0251278 A1 | 9/2013 | Izhikevich |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2014/0016858 A1 | 1/2014 | Richert |

OTHER PUBLICATIONS

Bohte, "Spiking Nueral Networks" Doctorate at the University of Leiden, Holland, Mar. 5, 2003, pp. 1-133 [retrieved on Nov. 4, 2012]. Retrieved from the internet: <URL: http://homepages.cwi.nl/-sbohte/publication/phdthesis.pdf>.

Brette et al., Brian: A simple and flexible simulator for spiking neural networks, The Neuromorphic Engineer, Jul. 1, 2009, pp. 1-4, doi: 10.2417/1200906.1659.

Cuntz et al., "One Rule to Grow Them All: A General Theory of Neuronal Branching and Its Paractical Application" PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Fidjeland et al., Accelerated Simulation of Spiking Neural Networks Using GPUs [online], 2010 [retrieved on Jun. 15, 2013], Retrieved from the Internet: URL:http://ieeexplore.ieee.org/xpls/abs_all.jsp?arnmber=5596678&tag=1.

Floreano et al., "Neuroevolution: from architectures to learning" Evol. Intel. Jan. 2008 1:47-62, [retrieved Dec. 30, 2013] [retrieved online from URL:<http://inforscience.epfl.ch/record/112676/files/FloreanoDuerrMattiussi2008.pdf>.

Gewaltig et al., NEST (Neural Simulation Tool), Scholarpedia, 2007, pp. 1-15, 2( 4 ): 1430, doi: 1 0.4249/scholarpedia.1430.

Gleeson et al., ) NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Izhikevich, "Polychronization: Computation with Spikes", Neural Computation, 25, 2006, 18, 245-282.

Izhikevich, "Simple Model of Spiking Neurons", IEEE Transactions on Neural Networks, Vol. 14, No. 6, Nov. 2003, pp. 1569-1572.

Izhikevich, "Relating STDP to BCM", Neural Computation 15, 1511-1523 (2003).

Karbowski et al., "Multispikes and Synchronization in a Large Neural Network with Temporal Delays", Neural Computation 12, 1573-1606 (2000).

Khotanzad, "Classification of invariant image representations using a neural network" IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Laurent, "The Neural Network Query Language (NNQL) Reference" [retrieved on Nov. 12, 2013]. Retrieved from the Internet: URL:http://nnql.org/nnql.org.

Laurent, "Issue 1—nnql—Refactor Nucleus into its own file—Neural Network Query Language" [retrieved on Nov. 12, 2013]. Retrieved from the Internet: URL:https://code.google.com/p/nnql/issues/detail?id=1.

Nichols, A Reconfigurable Computing Architecture for Implementing Artificial Neural Networks on FPGA, Master's Thesis, The University of Guelph, 2003, pp. 1-235.

Pavlidis et al. Spiking neural network training using evolutionary algorithms. In: Proceedings 2005 IEEE International Joint Conference on Neural Networks, 2005. IJCCN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.

Simulink® model [online], [Retrieved on Dec. 10, 2013] Retrieved from <URL: http://www.mathworks.com/products/simulink/index.html>.

Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8 (Russian Article with English Abstract).

Sjostrom J., W. Gerstner. Spike-Timing Dependent Plasticity. Scholarpedia, [Online], 2010, 5(2), 1362.

Szatmary et al., "Spike-timing Theory of Working Memory" PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2Fjournal.pcbi.10008 79#>.

Huh et al., "Generalized Power Law for Curve Movements" 2011.

Huh et al., "Real-Time Motor Control Using Recurrent Neural Networks" IEEEE Apr. 2009.

Huh, "Rethinking Optimal Control of Human Movements" Thesis 2012.

Mordatch et al, "Discovery of Complex Behaviors through Contract-Invariant Optimization" ACM Transactions on Graphics (TOG)—SIGGRAPH 2012 Conference.

Pham et al., "Affine invariance of human hand movements: a direct test" 2012.

Schaal et al., An Example Application of Policy Improvement with Path Integrals ($PI^2$), Jun. 9, 2010.

Todorov "Direct Cortical Control of Muscle activation in voluntary arm movements: a model" Nature America Inc. http://neurosci.nature.com 2000.

\* cited by examiner

US 8,793,205 B1

ROBOTIC LEARNING AND EVOLUTION APPARATUS

CROSS-REFERENCE TO RELATED APPLICATIONS

This application is related to a co-owned U.S. Patent Application Ser. No. 61/654,738 entitled "NEURAL NETWORK LEARNING AND COLLABORATION APPARATUS AND METHODS", filed on Jun. 1, 2012, co-owned U.S. patent application Ser. No. 13/487,576 entitled "DYNAMICALLY RECONFIGURABLE STOCHASTIC LEARNING APPARATUS AND METHODS", filed Jun. 4, 2012, and, U.S. patent application Ser. No. 13/548,071, entitled "SPIKING NEURON NETWORK SENSORY PROCESSING APPARATUS AND METHODS", filed Jul. 12, 2012, U.S. Patent Application Ser. No. 61/671,434 entitled "INTELLIGENT MODULAR ROBOTIC APPARATUS AND METHODS", filed on Jul. 13, 2012, U.S. patent application Ser. No. 13/601,721, entitled "APPARATUS AND METHODS FOR CONTROLLING ATTENTION OF A ROBOT", filed Aug. 21, 2012, U.S. patent application Ser. No. 13/601,827, entitled "APPARATUS AND METHODS FOR ROBOTIC LEARNING", filed Aug. 21, 2012, and U.S. patent application Ser. No. 13/623,812, entitled "ROBOTIC LEARNING AND EVOLUTION APPARATUS AND METHODS", filed herewith, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present innovation relates to training robotic apparatus comprising artificial neural networks by implementing evolution within a population of robotic devices.

2. Description of Related Art

Modifiable robotic devices used for educational proposes typically may require substantial programming efforts in order to implement functionality desired by users. Pre-programmed robots, (e.g., robotic toys and/or household appliances) may provide a pre-defined set of functions that are typically limited to simple operations, require remote control, and do not allow users to modify and/or add additional functionality. At present, most commercially available robots may have hardware and software designs such that the robot performs one or more out of a predetermined set of operations, and/or optimizes a predetermined cost function. For example, a Roomba® robot would sweep the floor more-or-less cleanly; but leave a large room full of Roombas alone for as long as it takes, and still no new "species" (model) of Roomba would evolve or emerge. Furthermore, programmatic efforts of one user may not easily be transferred to other users of the same type of educational robotic device. Low variety of pre-programmed robotic device functions often limits their use for educational purposes.

Accordingly, there is a salient need for improved mechanisms for developing diverse variety of traits for use by robotic devices.

SUMMARY

The present disclosure satisfies the foregoing needs by providing, inter alia, apparatus and methods for implementing robotic learning and/or evolution.

One aspect of the disclosure relates to a robotic apparatus comprising one or more processors. The one or more processors are configured to execute computer program modules. The computer program modules may be executable to effectuate a neural network. The neural network may be characterized by a configuration vector. The configuration vector may comprise a combination of at least a portion of a first parent vector and at least a portion of second parent vector. The first parent vector may be based on an operation of a first neural network of a first parent in accordance with a learning process. The operation of the first neural network may be characterized by a first network configuration vector configured based on the first parent achieving a first task. The second parent vector may be based on an operation of a second neural network of a second parent in accordance with a learning process. The operation of the second network may be characterized by a second network configuration vector configured based on the second parent achieving a second task. The combination may be based on a selection received from at least one agent responsive to the first parent achieving the first task and the second parent achieving the second task. The selection may be indicative of the first neural network and the second neural.

In some implementations, the configuration vector may comprise a plurality of weights associated with synaptic connections of the neural network.

In some implementations, individual weights associated of the configuration vector may be based on a linear combination of individual weights of the first parent vector and individual weights of the second parent vector.

In some implementations, the combination may comprise a random operation configured to introduce a random component into individual weights of the configuration vector.

Another aspect of the disclosure relates to a computer-implemented method of operating a robotic apparatus comprising network of a plurality of spiking neurons. The method may be performed by one or more processors configured to execute computer program modules. The method may include operating the network in accordance with a learning process configured to cause the apparatus to perform a task, the operating being characterized by a network state information. The method may include, based on a completion of the task, transferring at least a portion of the network state information to another robotic apparatus. The transferring may be configured to enable the other robotic apparatus to perform the task.

In some implementations, the network may comprise a plurality of connections configured to communicate spikes between the plurality of neurons. Individual ones of the plurality of connections may be characterized by connection weight. The operating network in accordance with the learning process may comprise adjusting one or more of the connection weights in accordance with a connection plasticity mechanism.

In some implementations, the completion of the task by the robotic apparatus may be characterized by an outcome having a performance value associated therewith. The outcome may be associated with a desired network state. The adjusting the one or more of the connection weights may be configured to transition present network state to the desired network state. The present network state may have a present performance value associated therewith. The present performance value may be lower than the performance value.

In some implementations, the other robotic apparatus may comprise another spiking network configured to operate in accordance with the learning process characterized by another present performance value. The enabling of the other robotic apparatus to perform the task may be characterized by the other network attaining another target performance that is greater than the other present performance.

In some implementations, the performance value may be within an range of performance values. The other robotic apparatus may comprise another spiking network configured to operate in accordance with the learning process. The enabling of the other robotic apparatus to perform the task may be characterized by the other network attaining another target performance that is within the established range.

In some implementations, the portion of the network state information may comprise a vector comprising a plurality of weights of individual ones of the plurality of connections. The other network may comprise another plurality of connections characterized by another vector of connection weights. The transferring may be configured to replicate the at least a portion of the vector within the other vector without relying on individual adjustment of weights of the other vector by the learning process.

In some implementations, the transferring may be configured to copy the vector into the other vector.

In some implementations, the transferring may be configured to apply a mathematical transformation to individual elements of the vector to obtain transformed vector. The other vector may comprise the transformed vector.

In some implementations, the transformation may comprise a random operation configured to introduce a random component to individual weight elements of the vector.

Yet another aspect of the disclosure relates to a computer-implemented method of updating a state of a neural network device. The method may be performed by one or more processors configured to execute computer program modules. The method may comprise: establishing a data connection to a cloud server apparatus; facilitating browsing of a plurality of state files via a user interface, the state files being stored on the cloud server apparatus; receiving a selection of an individual one of the plurality of state files; establishing a second data connection to the neural network device; and causing the extraction and application of a state by the neural network device, the state being described at least in part by the individual one of the plurality of state files.

Still another aspect of the disclosure relates to a computer-implemented method of updating a state of a neural network device. The method may be performed by one or more processors configured to execute computer program modules. The method may comprise: observing operation of two or more neural network devices, the operation having a selection threshold associated therewith; responsive to performance of another neural network device of the two more neural network devices being above the threshold, reproducing a configuration of the other neural network device by transferring at least a portion of neural network image of the other neural network device into the neural network device; and responsive to performance of another neural network device of the two more neural network devices being below the threshold, preventing reproduction of the configuration of the other neural network device.

In some implementations, the selection threshold may be associated with completion of a task by the other neural network device. The performance may be above the threshold is based on a completion of the task. The performance may be below the threshold is based on an unsuccessful attempt to complete the task.

In some implementations, individual ones of the two or more neural network devices may comprise autonomous racing robotic apparatus. The task may comprise a race between the autonomous racing robotic apparatus absent user intervention. The selection threshold may comprise winning the race.

In some implementations, the configuration of the other neural network may comprise a plurality of weights. The operation of the of two or more neural network devices may comprise learning adaptation of individual ones of the plurality of weights.

In some implementations, the configuration of the other neural network device may comprise one or more high-level neuromorphic description instructions configured to be executed by the two or more neural network devices. The observing may comprise comparing the one or more high-level neuromorphic description instructions to a template. The reproducing the configuration may be based on the one or more high-level neuromorphic description instructions matching a portion of the template. The preventing reproduction may be based on the one or more high-level neuromorphic description instructions deviating by an established measure from the template.

A further aspect of the disclosure relates to a cloud server system. The cloud server system may comprise a storage apparatus, a network interface, and one or more processors. The storage apparatus may be configured to store a plurality of neuromorphic apparatus state data. The network interface may be configured to receive one or more subscriber requests. The one or more subscriber requests may include a first subscriber request. The one or more processors are configured to execute computer program modules. Individual ones of the one or more processors may be communicatively coupled with the storage apparatus and the network interface. The computer program modules may be executable to perform a method to facilitate a business transaction. The method may comprise: authenticating a subscriber accessing the cloud server system via a user interface device; receiving the first subscriber request from the subscriber, the first subscriber request being for one or more of the plurality of neuromorphic apparatus state data; determining whether the subscriber is authorized to receive the one or more of the plurality of neuromorphic apparatus state data; and based on the determination, effectuating the business transaction by transmitting the one or more of the plurality of neuromorphic apparatus state data to one or both of: (i) a neuromorphic apparatus associated with the subscriber or (ii) the user interface device.

Further features of the present disclosure, its nature and various advantages will be more apparent from the accompanying drawings and the following detailed description.

Figure 1:
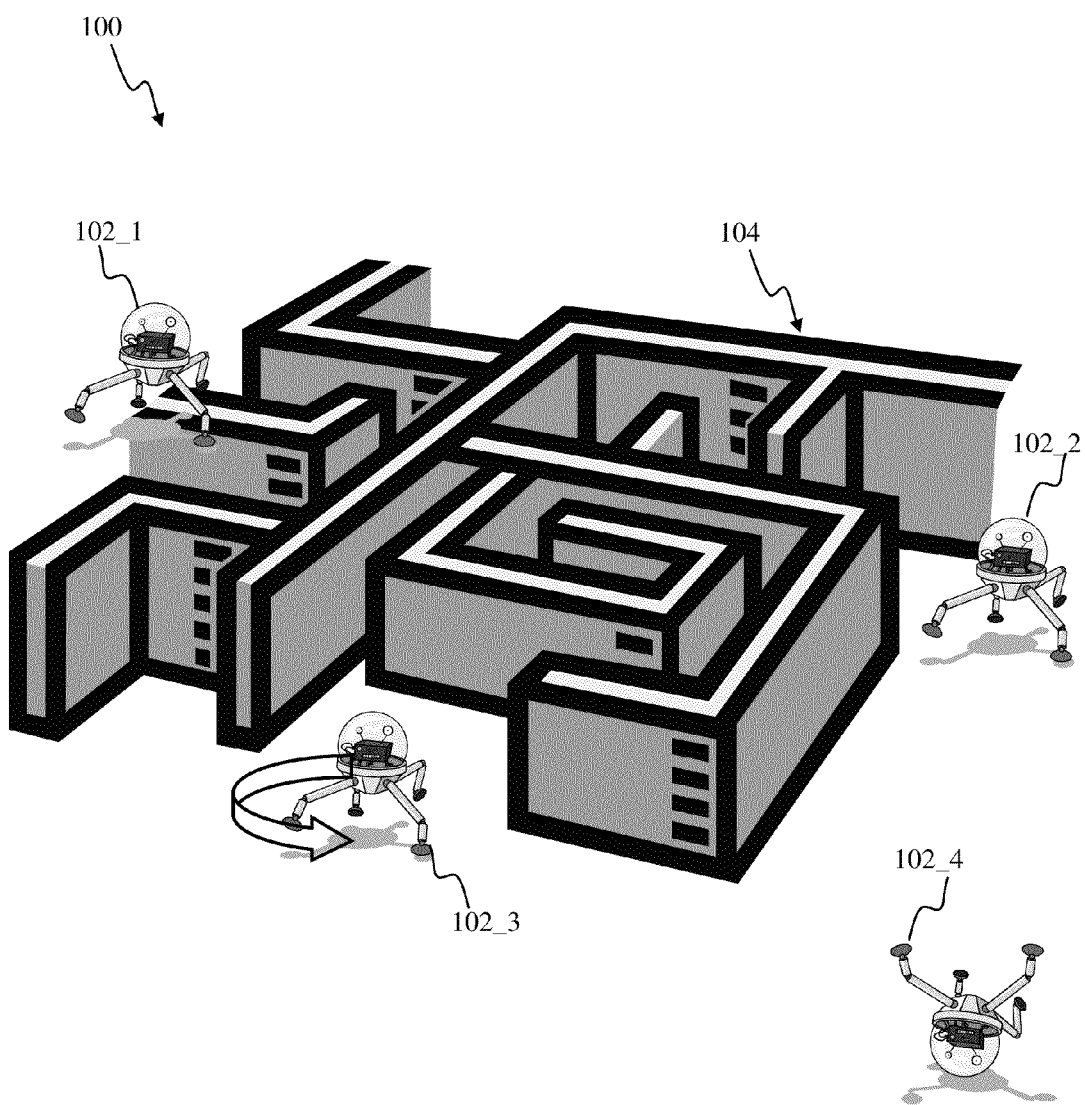
FIG. 1 is an illustration depicting a robotic ecosystem, according to one implementation.

All Figures disclosed herein are © Copyright 2012 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the invention is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

The present innovation provides, inter alia, apparatus and methods for implementing evolution in learning artificial neuron networks (ANN) for use in, inter alia, robotic devices.

In one or more implementations, an ecosystem of robots may comprise robotic devices of various types ('species') utilizing ANN for implementing learning of new traits. In one or more implementations, the ANN may comprise a spiking neuron network (SNN), such as described, for example, in pending U.S. Patent Application Ser. No. 61/654,738 entitled "NEURAL NETWORK LEARNING AND COLLABORATION APPARATUS AND METHODS", and U.S. patent application Ser. No. 13/487,576 entitled "DYNAMICALLY RECONFIGURABLE STOCHASTIC LEARNING APPARATUS AND METHODS", incorporated supra. An SNN may comprise hardware and/or software implementation of a plurality of single and/or multi-compartment neurons, as described in, for example, in U.S. patent application Ser. No. 13/385,933, entitled "HIGH LEVEL NEUROMORPHIC NETWORK DESCRIPTION APPARATUS AND METHODS", filed Mar. 15, 2012, incorporated herein by reference in its entirety. Individual neurons of SNN may be characterized by one or more of the following: (i) a firing rate as a function of time (with a time step, in one implementation, shorter than 1 s); ii) an excitability parameter (such as the neuron membrane potential or another suitable measure); (iii) active and/or passive state (corresponding for example to spike/no spike). In one or more implementations, updates of neuron states and/or excitability may be performed with a time resolution of 1 ms or better. The spiking neurons may be connected by hardware and/or software implemented connections ('synapses'), as described in detail with respect to FIG. 2, below.

A number of robots of one or more species may be contained in an enclosed environment. In some implementations, the enclosed environment may be implemented via a physical and/or logical boundary (fence) configured to enable the robots to remain within the boundary perimeter. The robots may interact with objects within the environment and with one another, while being observed by the human audience.

Individual robots may comprise one or more hardware modules. By way of non-limiting example, a hardware module may include one or more of a computerized brain comprising one or more ANNa, a body (e.g., a plane airframe, a torso, a rover, and/or other body), various sensory modules (e.g., camera, inertial sensors, touch, and/or other sensory modules), limbs, and/or other components. In some implementations, the SNN may comprise a plurality of stochastic neurons, (e.g. based on actual or simulated spiking neurons). In some implementations, such ANN may comprise an adapting system rather than a fixed unmodifiable implementation, thereby enabling the robots to acquire new traits with time.

In one or more implementations, the robots may be configured to 'reproduce'. In one or more implementations, the robot reproduction may comprise duplication, copy, merge, and/or modification of robotic brains (e.g., the ANN) configured to control the robotic device. In some implementations, copies of robotic brains (e.g., the ANN configurations) may be made by the human operators. The replicas may comprise full copies that take the entire designs of one (or more) 'parent' robots; or partial copies, where portions of parent's networks may be merged to produce the offspring. In some implementations, the replication process may employ mutations. In some implementations, the mutation may comprise stochastic changes in the parent(s) network during robotic brain transformations.

Probability of reproduction of the individual robots may be determined based on the robot's success in whatever function trait or behavior is desired. By way of illustration, a bi-pedaling robotic device that is configured to traverse the tack in a short amount of time may more likely be copied, as opposed to another bi-pedal robot that falls continuously. Similarly, an unmanned aircraft robot that remains in the air the longest may be more likely to be copied.

In some implementations, the robotic brain evolution may be facilitated by crowdsourcing, where multiple distributed users or agents may participate in determination of the likelihoods of cloning, reproduction, hybridization, removal, modification, and/or other actions aimed at particular robot and/or robots, and/or otherwise guide or affect the robot evolution described herewith.

The agents may include individual human users and/or collectives of human users. Examples of human users may include one or more of Brain Corporation personnel, authorized third parties, paying users, website visitors, and/or other human users. In some implementations, the agents may include non-human agents. Examples of non-human agents may include one or more of computer hardware and/or software, other robots and/or robot brains, artificial intelligence, voting systems with or without human participation, stochastic algorithms and/or devices, and/or other non-human agents. Various decision making schemes may be applied such as, for example, a simple majority, a percent of votes, N-winner takes all, range voting, and/or other methods for decision making.

In some implementations, robots, themselves, may actively affect the likelihoods of reproduction, survival of themselves and/or of other robots. By way on non-limiting example, a given robot may be attracted to and/or learn to choose a more suitable reproduction partner.

User-driven evolution of robotic species may enable development of a wide variety of new and/or improved functionality and provide entertainment and educational value for users.

Exemplary implementations of various aspects and implementations of the present technology are now described in detail. It will be appreciated that while described substantially in the context of autonomous robotic devices, the present disclosure is in no way so limited, the foregoing merely being but one possible approach. The technology is contemplated for use with any number of different artificial intelligence, robotic, and/or automated control systems.

In one implementation, a robot racing game may be developed for entertainment and/or education, as illustrated in FIG. 1. The game 100 may comprise one or more robots 102 configured to navigate a maze 104.

Figure 2:
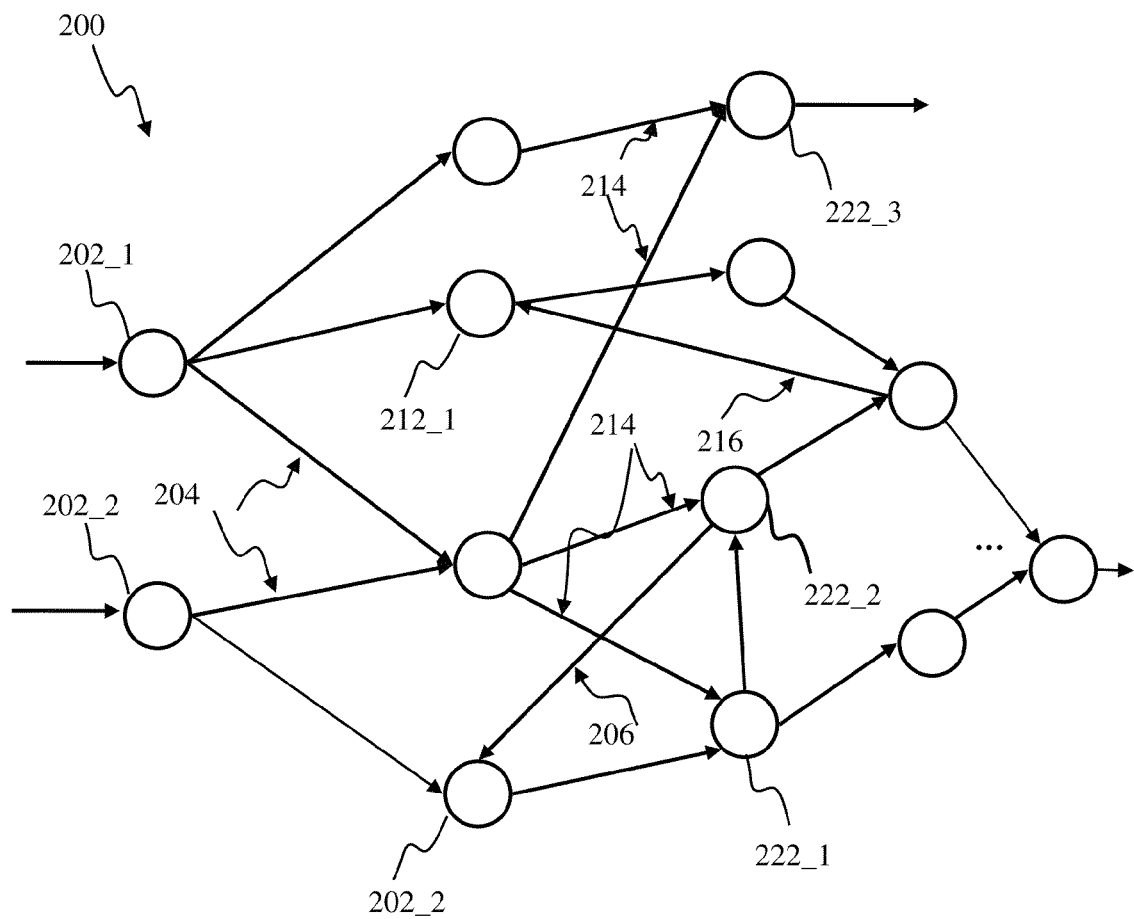
FIG. 2 is functional block diagram of one exemplary artificial spiking neural network useful with the present disclosure.

The robotic device 102 of FIG. 1 may comprise spiking neuron network 200, shown in FIG. 2. The spiking neuron network 200 may comprise one or more stochastic spiking neurons (units) 202. Individual units 202 may receive input via connections 204, also referred to as communications channels, or synaptic connections. Individual units 202 may be connected to other units via connections 204, also referred to as communications channels, or synaptic connections. The units (e.g., the units 206 in FIG. 2) providing inputs to any given unit via for example connections 204, are commonly referred to as the pre-synaptic units, while the unit receiving the inputs (e.g., the units 202 in FIG. 2) is referred to as the post-synaptic unit. Furthermore, the post-synaptic unit of one unit layer (e.g. the units 202 in FIG. 2) may act as the pre-synaptic unit for the subsequent upper layer of units (not shown). In some implementations, the network 200 may further comprise feedback connections 208. Feedback connections 208 may be configured to provide feedback data from higher to lower layers of the network (for example, from the neuron 202_3 of the third layer to the neuron 202_2 of the second layer, as illustrated in FIG. 2).

Individual ones of the connections (e.g., 204 in FIG. 2) may be assigned, inter alia, a connection efficacy. A connection efficacy may refer to a magnitude and/or probability of influence of pre-synaptic spike to firing of post-synaptic neuron, and may comprise, for example a parameter: synaptic weight, by which one or more state variables of post synaptic unit are changed. During operation of the pulse-code network (e.g., the network 200), synaptic weights may be adjusted using what is referred to as the spike-timing dependent plasticity (STDP) in order to implement, among other things, network learning. In some implementations, the STDP rule may comprise a long term potentiation (LTP) portion configured based on a pre-synaptic spike (event) occurring prior to the post-synaptic spike. In some implementations, the STDP rule may comprise a long term depression (LTD) portion configured based on the post-synaptic spike occurring prior to the pre-synaptic spike.

In various implementations, a number of different plasticity mechanisms may be used, such as those described in co-owned and co-pending U.S. patent application Ser. No. 13/488,106, filed on Jun. 4, 2012, entitled "SPIKING NEURON NETWORK APPARATUS AND METHODS" being previously incorporated by reference herein. As discussed therein, competition may be introduced among neurons, such as via homosynaptic and/or heterosynaptic plasticity or via a combination thereof. The homosynaptic plasticity may is realized, inter alia, as a spike-time dependent plasticity, where the strength of the synapse (e.g., the input delivered to the postsynaptic neuron per presynaptic neuron spike) changes according to the timing of the spikes of the said presynaptic and postsynaptic neurons. The heterosynaptic plasticity may be realized, inter alia, by changing the strength of the synapse between neurons A and B, and/or changing the STDP rules for the synapse from A to B, based on the activity of one or more neighboring neurons C1, C2. For example, when the neurons B, C do not respond to a particular input and/or input feature encoded by the neuron A, the synapse from A to B may be strengthened; when the neuron B responds to that feature before the neurons C may respond, the synapse from A to B may be strengthened (and/or or left unchanged in some implementations). when the neuron B responds to the feature after the neuron C has responded, the synapse from A to B may be weakened (and/or left unchanged in some implementations). In some implementations, the heterosynaptic plasticity may be implemented directly. IN one or more implementations, heterosynaptic plasticity may comprise modification of the STDP rules for the synapse. Such heterosynaptic plasticity mechanism may enable, inter alia, to produce a broader coverage of encoded features by the neurons.

One STDP weight adaptation rule described in the above-referenced application, implements synaptic weight change $\Delta w$ as a function of time difference between the time of post-synaptic output generation and arrival of pre-synaptic input $\Delta t = t_{post} - t_{pre}$. In some implementations, synaptic connections (e.g., the connections 204 in FIG. 1) delivering pre-synaptic input prior to the generation of post-synaptic response may be potentiated ($\Delta w > 0$), while synaptic connections delivering pre-synaptic input subsequent to the generation of post-synaptic response are depressed ($\Delta w < 0$).

In some implementations, described in detail in co-owned and co-pending U.S. patent application Ser. No. 13/541,531, filed on Jul. 3, 2012, entitled "CONDITIONAL PLASTICITY SPIKING NEURON NETWORK APPARATUS AND METHODS" being previously incorporated by reference herein, connections may be adjusted based connection efficiency parameter that describes a relationship between the total number of input delivered via the connection and the number of post-synaptic responses generated responsive to the inputs.

Neural networks, such as illustrated in FIG. 2, may be utilized in robotic devices. The network 200 may be configured by users to operate in accordance with a user-definable cost function (e.g., minimize battery energy consumption, and/or maximize vehicle speed, etc.). Accordingly, the restrictions, the constraints, and the local minima that plague a goal-oriented cost function may be replaced directly by (1) human-audience measure of "goodness" or desirability of the robot behavior and (2) an objective measure of robot longevity and robustness, as expressed by the time before breakdown and possibly additional measures of how sufficiently (or fully) functional the robot remains over the course of time.

In some implementations, the robotic brain may operate without pre-programmed and/or pre-configured task function. In some implementations, the robotic brain may operate in accordance with a generalized operational rule, such as, for example, "explore while self-preserve", and/or do not stay still within the same location (X,Y) longer than a time interval T, and/or other applicable rules. In some implementations, new traits (behaviors) may emerge as a result of random change of patterns of the network activity. In some implementations, such changes may occur within the same brain over time (time-domain learning). In some implementations, such changes may occur within different robotic brains (of the same and/or different users) at approximately the same time (brain-domain learning). Improvements to robot performance may arise as a result of robotic rain evolution (comprising random network adaptation and/or user intervention) without built-in cost functions. In some implementations, performance improvement may be related to a particular task (e.g., maze navigation of FIG. 1). In some implementations, performance improvement may comprise an increased repertoire of robotic brain traits (capabilities) such as, for example, ability to control camera position, acquire image frames, and perform object recognition. In one or more implementations, performance improvements may be judged by external agents (e.g., users and/or computerized devices) post-hoc.

Robotic devices may be characterized by a hardware and software configuration. The software configuration may comprise an ANN, also referred to as the "robotic brain". The rules of the robotic brain evolution the robotic ecosystem may be enacted, as described below with respect to FIGS. 3-5C.

The robot ANN configuration may be cloned, with or without mutations, to enable reproduction of robots. Network cloning may comprise a full and/or partial copying, as described with respect to FIG. 3, below. In some implementations, robotic brain modifications (e.g., addition of visual processing block) may be augmented by hardware modifications (e.g., addition of a camera sensor).

Figure 3:
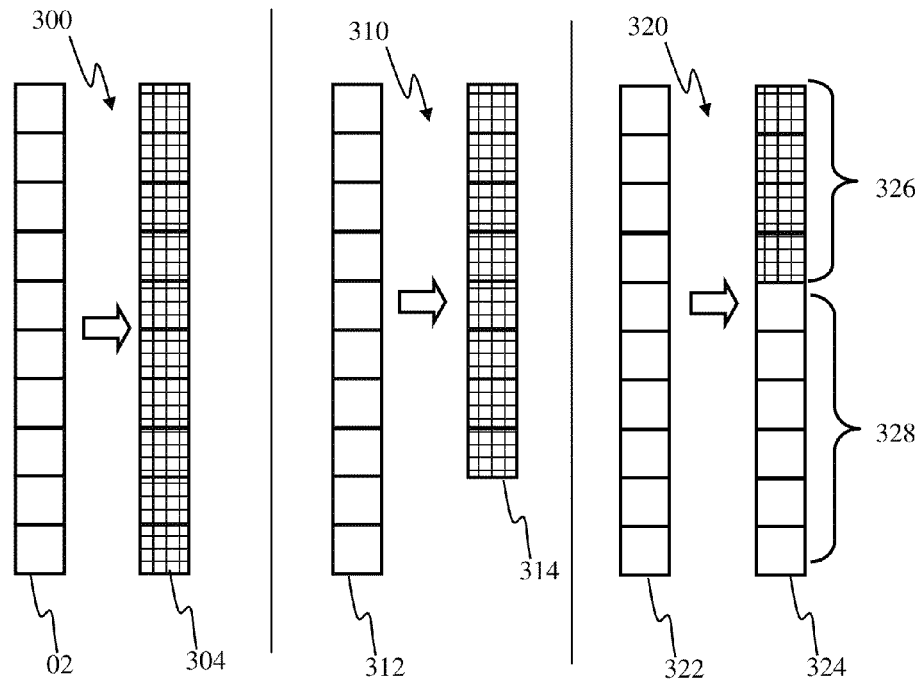
FIG. 3 is a functional block diagram illustrating network update in accordance with one implementation.
Figure 4:
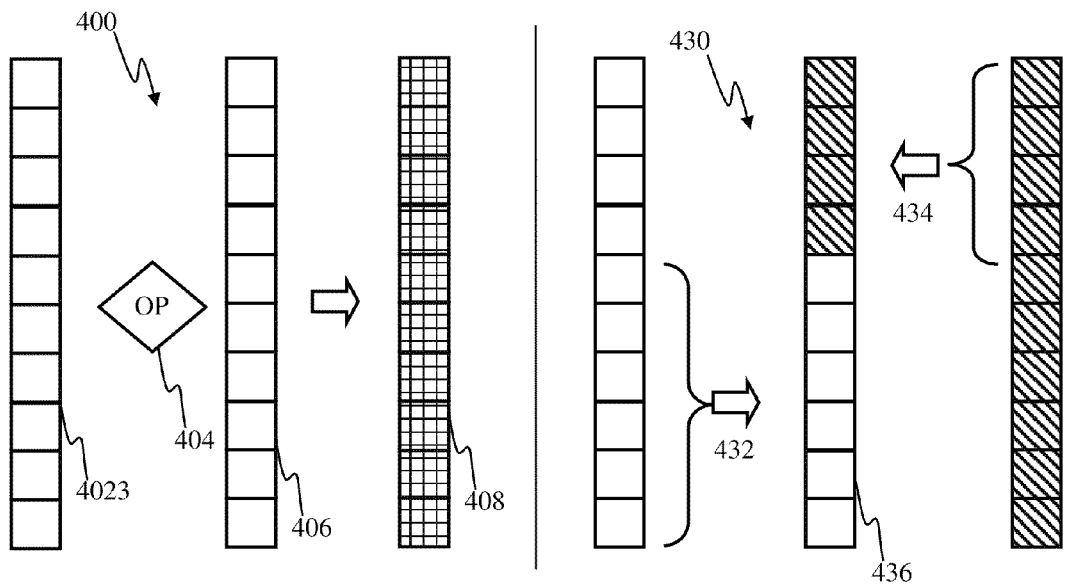
FIG. 4 is a functional block diagram illustrating one implementation of a network merge in accordance with one implementation.
Figure 5A:
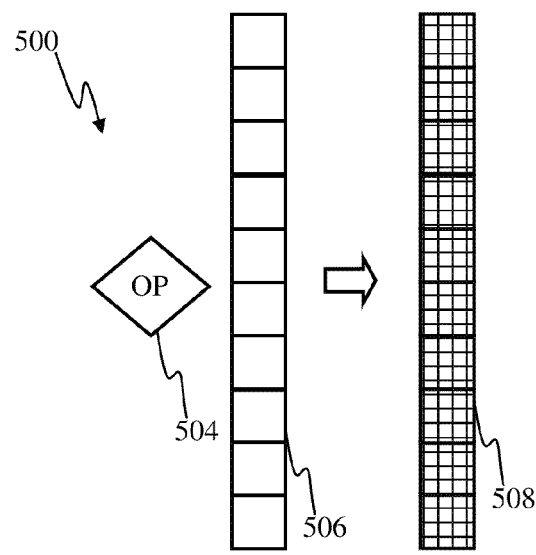
FIG. 5A is a functional block diagram illustrating one implementation of an evolutionary transformation in accordance with one implementation.
Figure 5B:
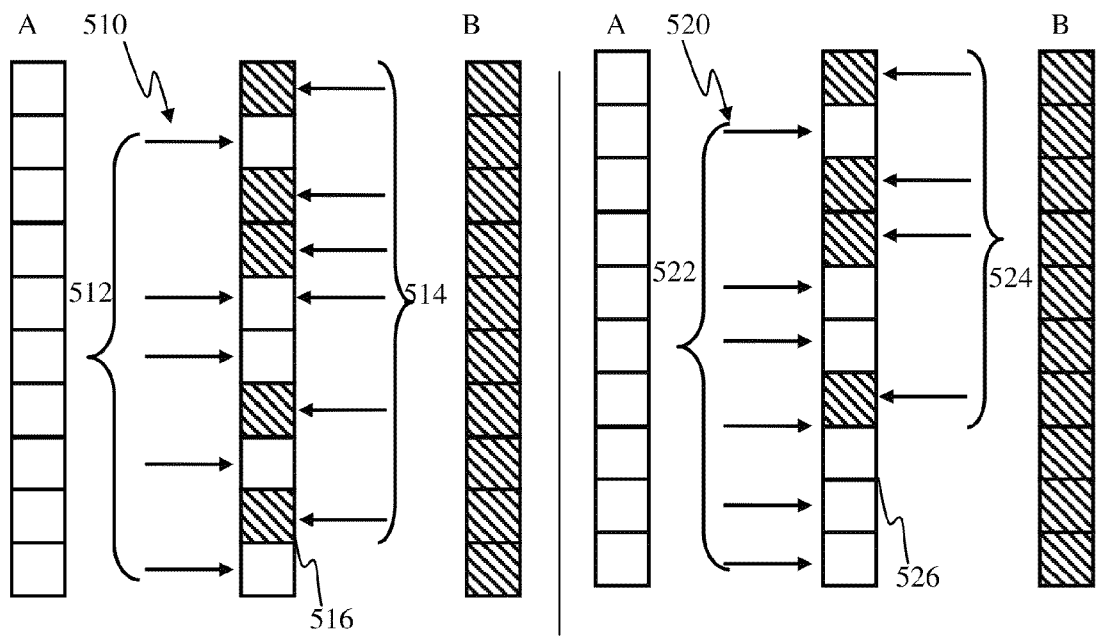
FIG. 5B is a functional block diagram illustrating one implementation of a transformation operation in accordance with one implementation.
Figure 5C:
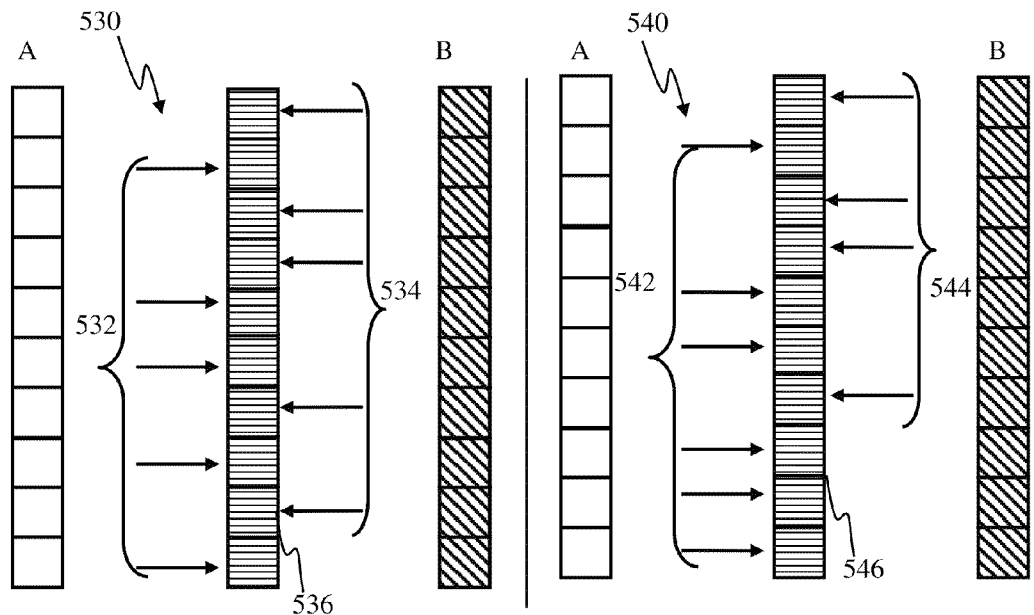
FIG. 5C is a functional block diagram illustrating second implementation of a transformation operation in accordance with one implementation.

Robot reproduction may be "parthenogenetic" (i.e., cloning of a parent robot in its current state, with or without mutations) as illustrated in FIG. 3 and FIG. 5A; and/or by combining hardware and/or software blocks from the two parent robots using via a combination rule, as illustrated in FIG. 4 and FIGS. 5B-C. In some implementations, the combination rule may comprise on or more logical operations and/or an independent-assortment law. In one or more implementations, the combination rule may comprise mutations, as described with respect to e.g., FIG. 5C.

In some implementations, the present state of either the entire robotic brain or of selected network blocks, comprising, for example, the present values of the synaptic strengths, may be transferred to the offsprings from parent(s) during robot reproduction.

While observing robots during their operation (e.g., robots 102 navigating the maze in FIG. 1) the users may apply "user selection" process to facilitate robotic evolution. By way of illustration, robots that cease to function (e.g., the robot 102_3 caught in a turn-around loop or the flipped robot 102_4) may be removed from the ecosystem. Specifically, while hardware of the robots 102_3, 102_4 may be re-used, their networks may not be propagated (reproduced). Conversely, the robots that function properly (survive) longer than others (e.g., the robots 102_1, 102_2 in FIG. 1) may be more likely to be reproduced.

Robots that develop brains that become profoundly distinct and/or incompatible with their hardware and/or software may have a diminished probability to sire a common progeny (sympatric speciation), such as, for example, the robot 102_4 in FIG. 1.

Likelihood of reproduction may decrease rapidly (referred to as allopatric or peripatric speciation) as the average physical (and/or logical) distance between the two robots increases. For example, while the winning of two (or more) robots engaged in a race on a track observed by the same user set (e.g., within the same physical room, and/or within the same online virtual race group) may be more likely to be replicated. However, robots operating at remote locations and/or by users not in interaction with one another, may be less likely be reproduced.

In some implementations, users may be present in the environment where robots operate and may exert an evolutionary pressure. A single user and/or a community of users may engage in activity related to robotic evolution. In some implementations, the activity may comprise a face-to-face and/or online game (e.g., bot race). In one or more implementations, the activity may comprise an online portal configured for, inter alia, exchanging user ratings (e.g., user votes) of various robotic devices performing an activity (e.g., race). Accordingly, in some implementations, when a sufficient number of negative (and/or absent) votes is cast for a particular robot as seemingly uninterested and/or unfit for the activity, the robot software (and/or hardware configuration) may be eliminated from reproducing pool.

When a sufficient number of users consider that a robot and/or a small population (e.g., 3-7) of robots, should be relocated or moved to a new environment, the robot and/or the small population of robots may be relocated or moved to the new environment.

When a sufficient number of users (e.g., 2-4) consider that a robot exhibits profoundly new and interesting behavior(s), the brain of the robot may be cloned.

FIG. 3 illustrates various exemplary implementations of robotic brain (network) modifications and/or updates. The network updates illustrated in FIG. 3 may comprise for instance a complete weight update 300, where the existing trained weights vector W 302 is replaced with a different weight vector 304. Such implementations may be used for example, when operating several identical robotic devices and the network weight configuration of a single 'trained' apparatus is downloaded into other (untrained) devices. The update implementation may also be used when (improved) training versions of network are cloned and distributed by one user (and/or a vendor) to other user with (or without) a cost associated therewith.

In some implementations, the new weight vector may comprise more (not shown) of fewer elements, as illustrated for example by the update 310, comprising the replacement weight vector 314 comprising fewer elements compared to the original weight vector 312.

In some implementations, only a portion of the network weights may be updated as, as illustrated for example by the update 320 of FIG. 3, comprising the replacement weight vector 324 comprises the replacement portion 326, configured to replace the respective weights from the original weight configuration 322. The remaining portion 328 of the network weights remains unchanged. Fewer elements may remain compared to the original weight vector 312. Such implementations may be used for example, when updating one or more modules of a partitioned network, (e.g., a motor-control partition, or a signal processing partition). The update implementation may be used when (improved) training versions of network are distributed by one user (and/or a vendor) to other user with or without a cost associated therewith. In some implementations, the update 320 may be utilized to implement a new version of sensor or actuator driver, a more efficient sensor encoder, input/output interface protocol, and/or other information.

In some implementations, the weight vector modifications and/or updates may include removal and replacement of obsolete (or temporally unused) features. This may include, by way of non-limiting example, replacing a motor control portion with a more advanced video processing portion of the network when a mobile robotic device is deployed in stationary fashion in order to comply with the hardware constraints (e.g. on-board memory size, and/or power consumption).

In some implementations, the network lifecycle may comprise network weight updates comprising two or more sources ('parents'), also referred herein to as "merges".

In one or more implementations, such as the merge 400 illustrated in FIG. 4, the 'offspring' network configuration (e.g., the weight vector W) 408 may be obtained using two parent weight vectors 402, 406 combined via an operation 404.

In some implementations, the network merge may comprise non-interleaved combination as illustrated by the merges 430 in FIG. 4, where the parents A provides the portion 432 and the parent B provides the portion 434 to the offspring 436. In some implementations (not shown), the portion 432 may comprises the same number of weights as the portion 434. The non-interleaved network merge, such as illustrated in FIG. 4, may be used, for example, to combine capabilities of two (or more) parents or to add a capability to one of the parent network.

Various operations 404 of FIG. 4 may be used to produce contributions by one or more parent. In one or more implementations, the offspring weight vector may be determined by combining the traits from parent A and parent B are combined as follows:

$$W^{off} = (W^A \text{ OR } W^B) \quad \text{(Eqn. 1)}$$

In one or more implementations, the offspring weight vector may be determined by determining traits in the parent B that are not in the parent A and adding these to the parent A as follows:

$$W^{off} = (W^A \text{ AND } W^B). \quad \text{(Eqn. 2)}$$

In some implementations, the offspring network may be generated busing weight generating principles and/or characteristics of one or more parents. By way of illustration, plasticity window of a parent A, who exhibits desired pattern recognition performance (e.g., pattern variety, recognition accuracy and/or speed) may be conglomerated with weight decay rate of another parent network which exhibits desired motor control performance.

The offspring may inherit one or more synaptic properties from one or more parents. In one or more implementations, the offspring may inherit one or more first synaptic properties from parent A for some synapses, and may inherit one or more second synaptic properties from parent B for some synapses. In some implementations, the offspring may inherit some synaptic properties (e.g., plasticity rule type) from parent A and other synaptic properties (e.g., time scales) from parent B for all of the offspring synapses. In some implementations, the synaptic properties may comprise one or more of post-synaptic conductance(s), plasticity mechanism(s), plasticity rules, time scales, and/or other synaptic properties.

In one or more implementations, the offspring may inherit neurons and/or neuronal properties. In some implementations, the neuron properties may comprise one or more of neuron firing threshold, resting potential, and/or other properties of neuron dynamic process.

In some implementations, the offspring may inherit network components, network architecture, network plasticity and/or learning mechanisms from more than a single parent.

In some implementations, the network lifecycle may comprise evolutionary network weight merges (described with respect to FIGS. 5A-5B, discussed below). In one or more implementations, the parent and the offspring networks may be configured to operate on robotic devices comprising the same (or similar) hardware/software configuration. The same or similar hardware/software configuration may include that of a sensor and actuator complement, available synaptic memory, processing capacity, and/or other configurations.

In one or more implementations, such as the merge 400 illustrated in FIG. 4, the evolutionary 'offspring' network configuration (e.g., the weight vector W) 408 may be obtained using two parent weight vectors 402, 406 combined via an operation 404.

In some implementations, such as the evolutionary transformation 500 illustrated in FIG. 5, the 'offspring' network configuration 508 may be obtained using a single parent weight vector 502 transformed via the operation 504.

Various exemplary implementations of the transformation operations 404, 505 are illustrated with respect to FIGS. 5B-5C. The merges 510, 520 illustrated in FIG. 5B may comprise interleaved segments of weights from parent A and parent B (the segments 512, 522 from the parent A and the segments 514, 524 from the parent B, respectively, in FIG. 5B) to produce the offspring weight vectors 516, 526, respectively. While the combination 510 may comprise equal contributions from each parent, the combination 520 may comprise non-equal contributions, with the parent 522 providing a larger portion of the weights to the offspring 526. Although the parent A, the parent B and the offspring are shown as separate entities in FIG. 5B-5C for clarity, it will be appreciated by those skilled in the arts that such may not always be the case. By way of illustration, in some implementations, the offspring may comprise either (or both) of the parents A or B. In such implementation, a computerized device may be used to assist the merge store intermediate offspring weight configuration during the merge, and to update one (or both) of the parents.

The interleaved network merge may be used in some implementations to generate new weight vector for a network configured to be use by offspring configured to implement (a subset) of parent functionality. By way of illustration, two or more trash collector robotic apparatus (e.g., employed in a home or an office building) and comprising similar hardware (e.g., sensors and actuators) but trained under different conditions and, hence, comprising different sets of network weights, may utilize interleaved merge to produce an offspring exhibiting combined set of capabilities.

In some implementations, the number of segments 512, 514 and segment length may be pre-determined. In some implementations, the number of segments and/or their length may be selected at random (given the W vector length constraint).

In some implementations, the robotic brain may be pre-segmented into several modules, such as sensory, navigation, decision-making, motor-control, communication, and/or other modules. Properties of individual modules may correspond to a single network segment (e.g., the segment 512, 514 of FIG. 5). In some implementations, module properties may comprise connectivity, neuronal, and/or plasticity parameters. In one or more implementations, connection parameters (e.g., weights) between the segments may be selected using any of the methodologies described herein.

In one or more implementations, a robotic brain of a device may be configured to emulate functionality of biological supraesophageal ganglion. A supraesophageal ganglion network block may comprise one or more segments emulating a subesophageal ganglia, thoracic ganglia, abdominal ganglia, and/or other ganglia. In some implementations, individual ganglions and/or group of ganglia may present a single segment for the network merge. In one or more implementations, individual ganglions may be split into several segments. Such segments may include one(s) associated with visual modules, chemosensory modules, associative modules of the supraesophageal ganglion, and/or other modules. The multi-segment ganglion configuration may reduce the interdependence of the network segments, reduce inter-segment connectivity, and/or improve modularity of the network design.

By way of illustration, in a network comprising 1000 synapses, the merge 520 may be configured as follows:
- select splice points at locations 75, 225, 300, 600, 892;
- use parent A to provide weights for the segments in the ranges: 1-74, 225-299, 600-891; and
- use parent B to provide weights for the segments in the ranges: 75-224, 300-599, 832-1000.

In some implementations, the splice point positions may be varied with e.g., some random jitter, e.g., with respect to Example 1, the splice points may be varied by ±N points and comprise (75, 223, 300, 601, 888) in one realization with N=5.

Data merges for one or more segments (e.g., the segment 532, 542 in FIG. 5C) may employ various transformations 504 as describe with respect to FIG. 5C. In some implementations, the transformation 504 may be implemented using the following generalized form:

$$W^O_i + AW^A_i + BW^B_i + CN_i,$$ (Eqn. 3)

where $N_i$ is the random weight component, configured to effectuate, inter alia, exploration during leaning by the offspring network (i.e., mutations). FIG. 5C illustrates two exemplary implementations of inter-parent transformation with mutation 530, 540, that may be performed in accordance with Eqn. 3Eqn. 3. In FIG. 5C, the offspring network weight vectors 536, 546 comprise weight contributions from both parents (532, 534) and (542, 544), respectively, with an additional random component.

In some implementations, the coefficients A, B, C may be selected such that the weights of the offspring are normalized to the same range as the weights o the parents, e.g., A+B+C=1.

In one implementation, either of the weight coefficients A, B may be set to zero and the transformation of Eqn. 3 describes 'self-mutation'.

In some implementations, the coefficients A, B may be selected as A=B=0.5, corresponding to inter-parent average with mutation.

$$W^O_i = (W^A_i + W^B_i)/2 + CN_i.$$

In some implementations the transformation of Eqn. 3 may be used to describe the insert/delete transformation as well as setting weights using a random distribution, for one or more segments (e.g., the segment 532, 542 in FIG. 5C).

In some implementations, the transformation 504 may comprise a majority rule so that if both parents have the same weight values, the offspring has the same value. Individual ones of the rest of offspring weights may be set to one or more of (i) a random value, (ii) an inter parent average, (iii) a segment average, and/or another value.

In some implementations, the transformation 504 may comprise a minority rule so that if both parents have the same weight values, the offspring has a random weight value. Individual ones of the rest of offspring weights may be set to one or more of (i) a random value, (ii) an inter-parent average, (iii) a segment average, and/or another value.

Exemplary implementations of the network life cycle, comprising training and transformation methodology described herein advantageously enable, inter alia, provision of trained robotic apparatus via network transfer, update and/or merge, and facilitate training of robotic networks via evolutionary merges.

Referring now to FIGS. 7-9D, exemplary uses of the network life cycle methodology according to the disclosure are described. In some implementations, the methods of FIG. 7-9D may be used, for example, for operating the robotic apparatus 620 of FIG. 6. The method FIGS. 7-9D may be implemented for example in a robotic device configured for processing of sensory data as described with respect to FIG. 10, infra, thereby advantageously aiding, inter alia, signal compression, and/or object recognition when processing visual sensory input.

Figure 6:
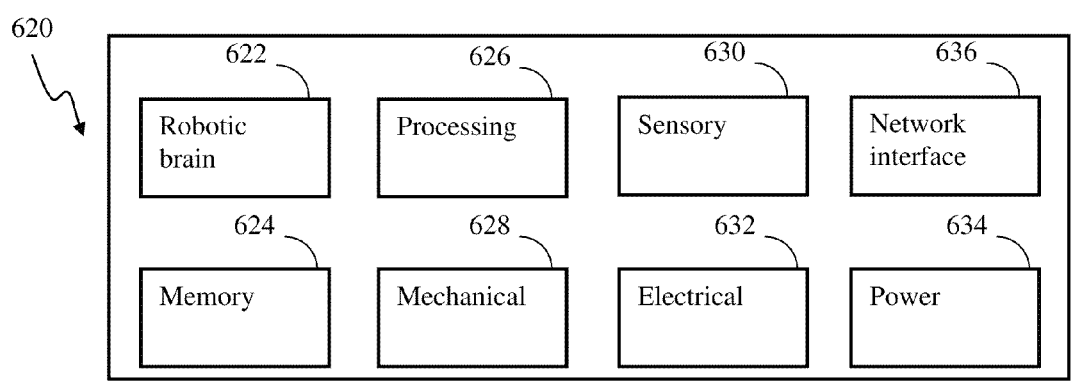
FIG. 6 is a functional block diagram illustrating one implementation of a robotic apparatus in accordance with one implementation.
Figure 7:
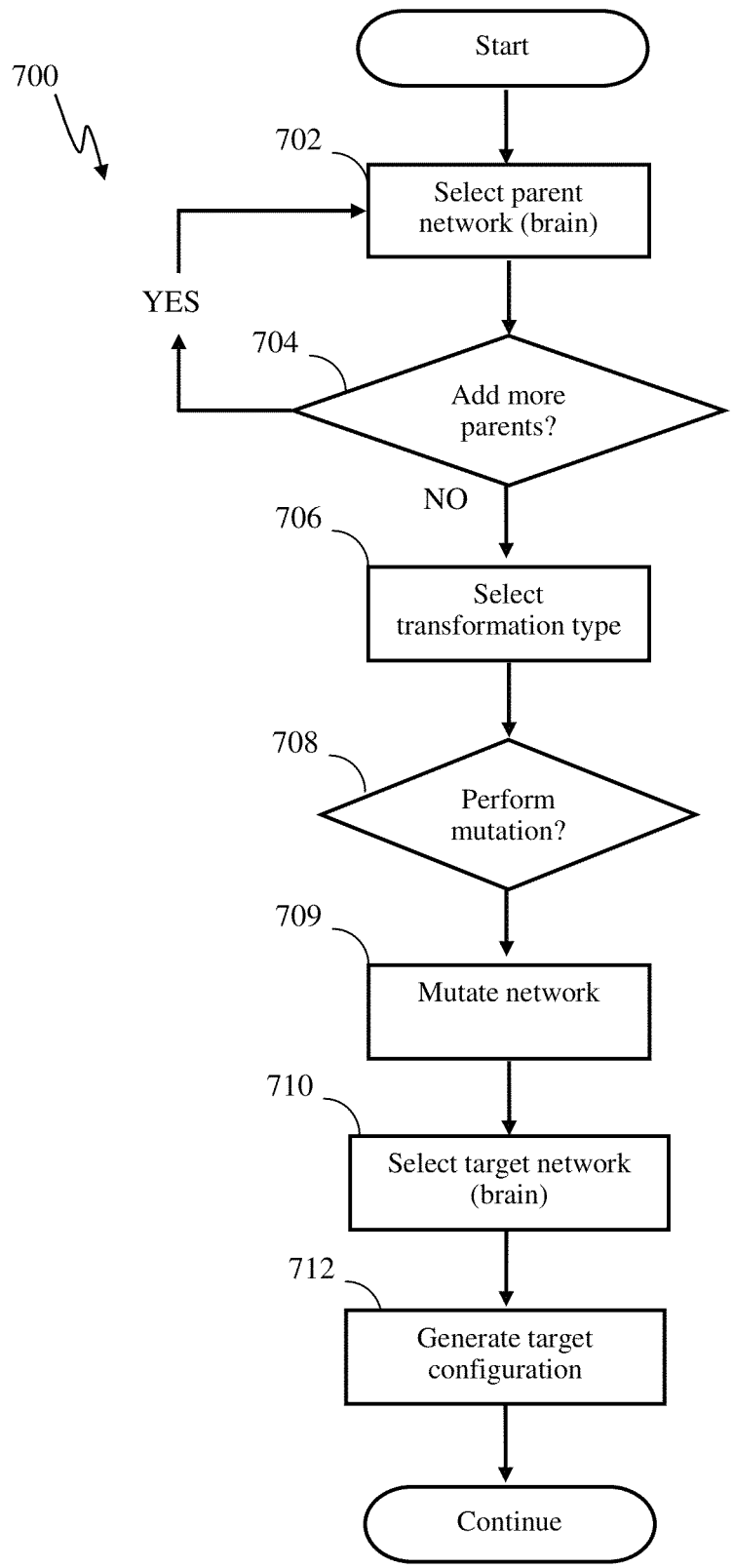
FIG. 7 is a logical flow diagram illustrating generalized method of robotic brain transformation comprising one or more parents for use with the robotic apparatus of FIG. 6, in accordance with one or more implementations.

FIG. 7 illustrates one exemplary implementation of a generalized method of robotic brain transformation for use with the robotic apparatus of FIG. 6.

At step 702 of method 700 a parent robotic brain (e.g., the brain 622 of FIG. 6) may be selected. In some implementations, the robotic brain may comprise a plurality of network weights, such as described with respect to FIGS. 3-5C above.

In some implementations, the transformation of method 700 may comprise two or more parents. Accordingly, additional robotic brain(s) may be added to the parent pool at step 704

At step 706, the transformation type may be selected. In some implementations, the transformation may comprise a single parent full and/or partial copy, as illustrated in FIG. 3. In some implementations, the transformation may comprise a modification (e.g., a mutation) of the single parent brain, as illustrated in FIG. 5A. In one or more implementations, the transformation may comprise multi-parent merge (with or without mutation), as described with respect to FIGS. 4, 5B above.

When the transformation comprises mutation, determined at step 708, the source network weights may be modified at step 709. In some implementations, the mutation may be effectuated by adding random component to one or both parent weights, and/or to the target weights. In some implementations, the mutation may be implemented by selecting random splice point locations within the vector of weights, as described with respect to FIG. 5B, above.

At step 710, target brain (e.g., target network) may be selected. In some implementations, the target may comprise one (or both) parents. In some implementations, the target may comprise new robotic brain.

At step 712, the target brain configuration (e.g., the target network) may be generated using the transformation selected at step 706-709.

Figure 8:
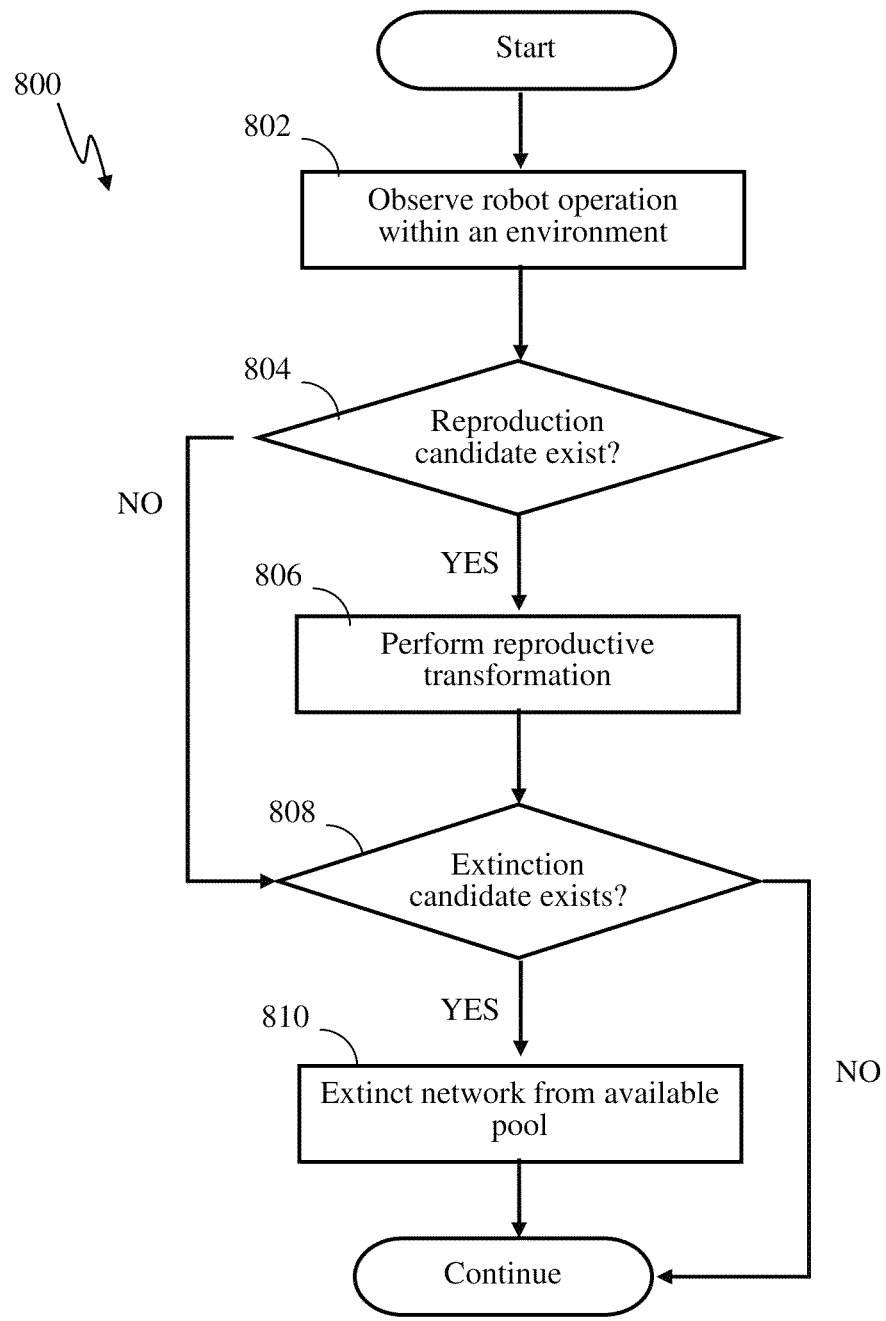
FIG. 8 is a logical flow diagram illustrating a generalized method of user-driven evolution of robotic brains for use with robotic devices of FIG. 1, in accordance with one implementation.

FIG. 8 illustrates a generalized method of user-driven evolution of robotic brains for use with robotic devices of FIG. 1, in accordance with one implementation.

At step 802 of method 800, an external agent may observe operation of two (or more robots). In some implementations, the agent may comprise one or more users observing a robotic game (e.g., race or maze navigation contest). In some implementations, the agent may comprise a computerized apparatus (e.g., a camera coupled to a processor) configured in accordance with one or more robot selection rules.

In some implementations, the robotic brain evolution may be facilitated by crowdsourcing. In such crowdsourcing, multiple distributed users and/or agents may participate in determination of the likelihoods of one or more of cloning, reproduction, hybridization, removal, modification, and/or other actions aimed at particular robot and/or robots, and/or otherwise guide or affect the robot evolution described herewith.

In some implementations, the hybridization may use components from two or more dissimilar parents. The dissimilar parents may comprise robotic brains trained in different environments. Examples of such different environments may include one or more of mazes with different layouts, tracks with a different number of obstacles, and/or other different environments. In some implementations, the dissimilar parents may comprise robotic brains trained by different crowds and/or agents. In some implementations, the reproduction may utilize components from two or more similar, but not identical, parents. The similar (but not identical) parents may correspond to brains of robots trained on the same or similar race tracks. In one or more implementations, cloning may comprise an exact copy of one parent. In one or more implementations, cloning may comprise a copy of one parent with one or more mutations.

At step 804, a determination may be made regarding existence of robots that may be reproduced. In some implementation, the determination of step 804 may comprise selecting one or more robots that are the fastest racers.

At step 806, the robot brains, selected at step 804, may be reproduced using any of the methodologies described herein (e.g., with respect to FIGS. 3-5B, and/or FIG. 7).

In some implementations, the reproduction may comprise hybridization of one candidate brain with another brain or brains. In one or more implementations, the robotic brains involved in the transformation of step 806 may correspond to robotic devices trained in the same and/or similar environment (e.g., the same and/or similar version of the maze of FIG. 1). In some implementations, the robotic brains involved in the transformation of step 806 may correspond to robotic devices trained in different environments (e.g., different games, different tasks, and/or other different environments). In some implementations, the robotic brains involved in the transformation of step 806 may correspond to robotic devices trained by different agents.

In one or more implementations, the transformation of step 806 may comprise mutations. In one or more implementations, the transformation of step 806 may be based on and/or accompanied by a modification of robotic hardware. In some implementations, the hardware modification may comprise one or more of adding, replacing, and/or removing components. Such components may include one or more of sensors, manipulators, SNN components, and/or other components.

In one or more implementations, the transformation of step 806 may comprise a determination of whether the robot is to be moved to a different environment. In some implementations, the moving of the robot may be used (i) to increase behavioral repertoire of the robot, (ii) to test the robot's survivability and/or adaptability, (iii) to provide novel stimuli to the robot's learning network, and/or for other purposes associated with moving the robot.

In one or more implementations, the transformation of step 806 may comprise cloning of the reproduction candidate. In some implementations, the cloning may comprise one or more mutations.

In one or more implementations, the transformation of step 806 may comprise modification of the robot's environment. In some implementations, the environment modifications may comprise one or more of additional, less, and/or modified turns in the maze; additional, less, and/or modified obstacles in the maze, and/or other modifications to the environment. In some implementations, the environment modifications may be used in order to, for example, present the robot with extra challenges.

In one or more implementations, the transformation of step 806 may be used to increase robot longevity. Robot longevity may be characterized by a mean time between failures.

In one or more implementations, the transformation of step 806 may be configured to reduce a probability of reproduction in accordance with a measure associated with the one or more reproduction candidates. In some implementations, the measure may comprise a time average and/or an RMS of the spatial distance between the candidate robots, and/or other measures. In some implementations, the reproduction may be prevented between the two spatially non-overlapping populations of robots. In one or more implementations, the transformation may emulate one or more of biological allopatric speciation, peripatric speciation, parapatric population speciation, and/or other transformations.

In one or more implementations, the transformation of step 806 may be configured to configure a probability of robot reproduction based on the similarity between two robotic parent candidates. This may serve as an emulation of sympatric speciation within biological populations.

At step 808, a determination may be made regarding existence of robots that may go extinct. In some implementation, the determination of step 804 may comprise selecting one or more robots that fail to complete the task (e.g., the robot 102_3 of FIG. 1) and/or failed task (e.g., the robot 102_4 of FIG. 1). In some implementation, the determination of step 804 may comprise selecting one or more robots that perform sub-par.

At step 810, the robot brains, selected at step 804, may be removed from the pool of available brains (e.g., the network configuration purged).

In some implementations, the method 800 may be implemented within an actual robotic device, e.g., comprising a hardware platform (rover). In one or more implementations, the user may run network simulations using a computer simulation environment (sandbox). In some implementations, the method 800 may be applied to a 'robotless' brain, e.g., a learning network that may not require a hardware components (e.g., sensors, actuators) for example, game application, data processing software (pattern classification) operating on a computer, and/or a server.

Figure 9A:
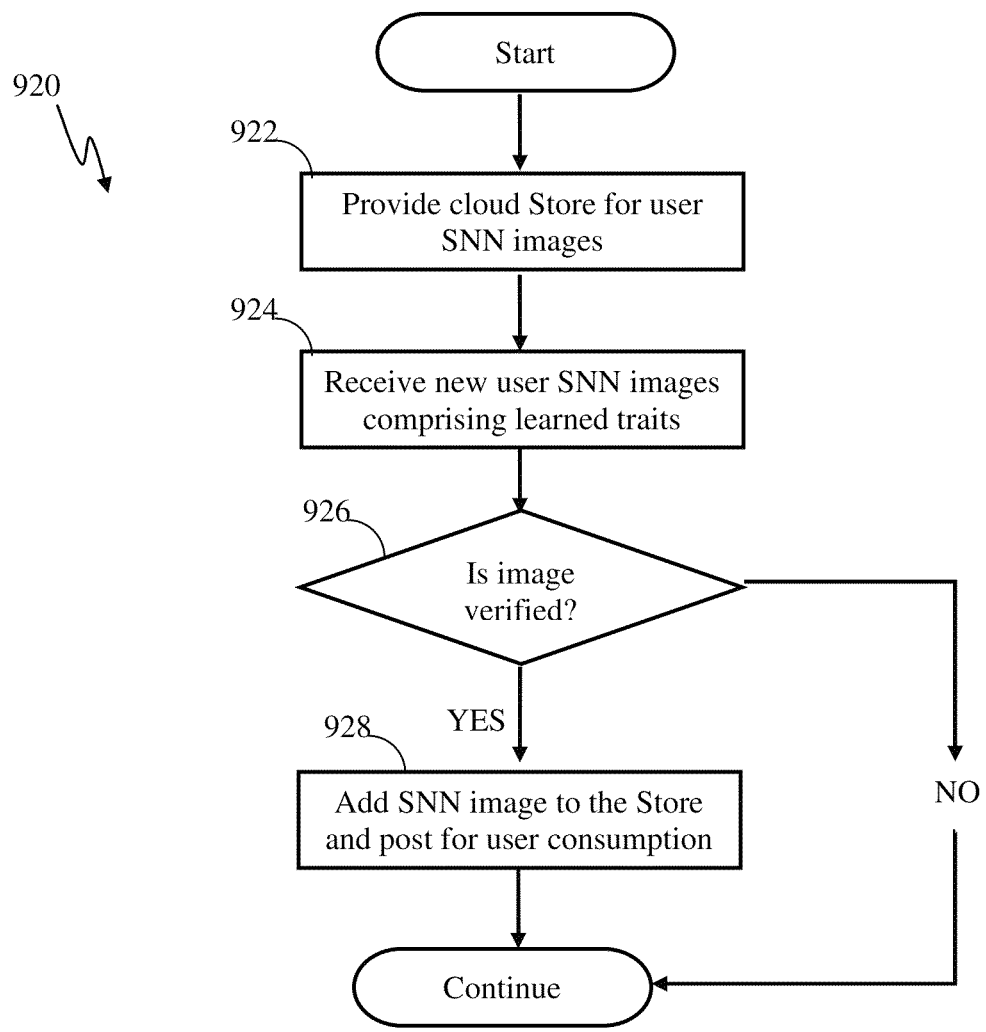
FIG. 9A is a logical flow diagram illustrating generalized method for cloud store of learned traits life cycle management, in accordance with one implementation.
Figure 9B:
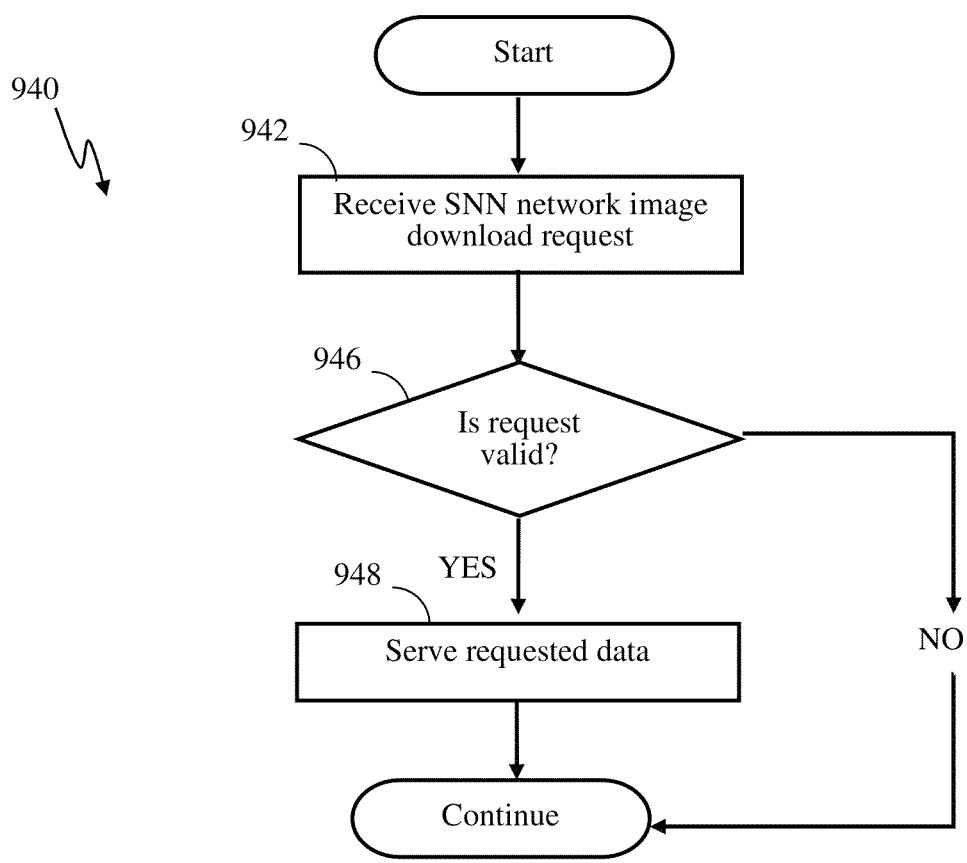
FIG. 9B is a logical flow diagram illustrating provision of learned traits by the cloud store, in accordance with one implementation.

FIGS. 9A-9B illustrate methods of cloud store operation configured to enable users of robotic devices to modify and/or share robotic brains, in accordance with one or more implementations.

Figure 12:
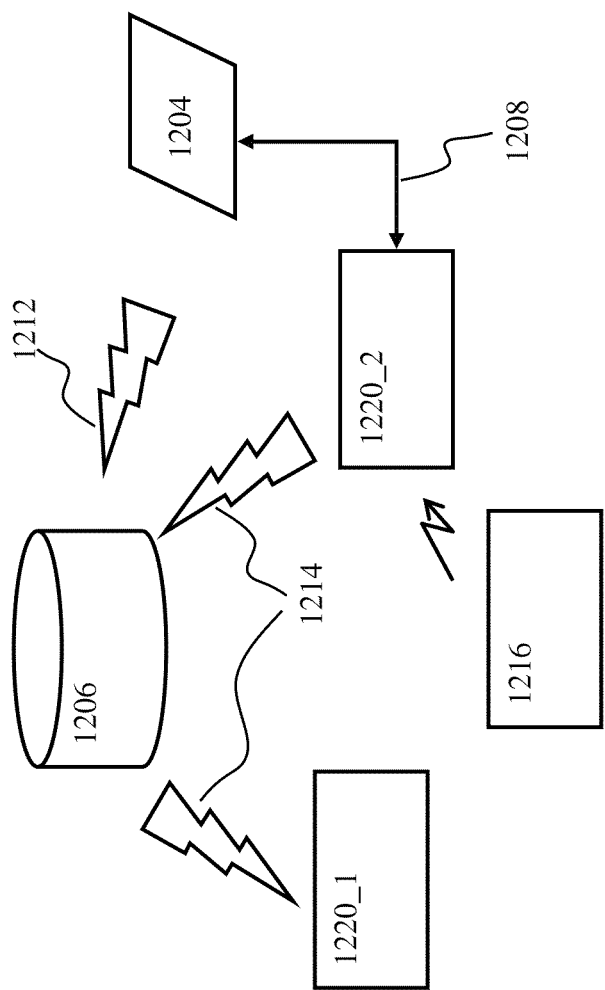
FIG. 12 is a functional block diagram illustrating cloud server repository in accordance with one implementation.

At step 922 of method 920 of FIG. 9A, users may be provided with access to the cloud store (e.g., the depository 1206 of FIG. 12).

In some implementations, the depository may comprise a cloud server depository 1206, described in detail in FIG. 12. In FIG. 12, one or more remote user devices 1220 may connect via a remote link 1214 to the depository 1206 in order to save, load, update, and/or perform other functions. their network configuration. The one or more remote users devices may further interface to a local user computerized device in 1204 via link 1208 in order to facilitate learning configuration and software maintenance of the user device 1220. In one or more implementations, the local link 1208 may comprise a network (Ethernet) or a serial link (USB, Firewire, etc.) The local computerized device 1204 may communicate with the cloud server repository 1206 via link 612. In one or more implementations, links 1212 and/or 1214 may comprise an internet connection, effectuated via any of the applicable wired and/or wireless technologies (e.g., Ethernet, WiFi, LTE, CDMA, GSM, and/or other technologies). In some implementations, the remote user devices 1220 may interface to a remote control module 1216 (e.g., a clicker) via a short range wireless link (e.g., IR, Bluetooth, and/or other link) in order to receive, for example, reward signal (e.g., clicks) during training of the device 1220.

In some implementations, access may comprise a storefront is provided as a user interface to the cloud. From the storefront, users may access purchasable content (e.g. brain images, upgrades, alternate firmware packages). Purchasable content may allow users to conveniently obtain quality content to enhance their user experience; the quality may be controlled under any number of different mechanisms, such as peer review, user rating systems, functionality testing before the image is uploadable or made accessible, etc. In some cases, users prefer different starting points in training. Some users generally prefer to begin with a clean slate, or to use only their own brain images as starting points. However, other users may generally prefer not to have to redo training that has already been (properly or suitably) performed. Thus, these users may appreciate having easy access to quality-controlled purchasable content.

A subscription model may be used. In various implementations, a user may gain access to content based on a periodic payment to the administrator of the networked service. A hybrid model may be used. An initial/periodic subscription fee may allow access to general material, but premium content requires a specific payment.

Users that develop skill in training or those that develop popular brain images may wish to monetize their creations. An exemplary storefront implementation may provide a platform for such enterprise. Operators of storefronts may desire to encourage such enterprise both for revenue generation and for enhanced user experience. The storefront operator may institute competitions with prizes for the most popular brain images, modifications, and/or media. Consequently, users may be motivated to create higher quality content. The operator may instate a system of revenue and/or profit sharing for purchasable content. Thus, hobbyists and casual developers may see a reasonable return on their efforts. Such a system may attract professional developers. Users as a whole may benefit from a wider array of content offerings from more skilled developers.

At step 924, a network image file, which may comprise inter alia new and/or improved learned traits, may be received from a user.

At step 926 the image may be verified for compatibility, consistency and/or presence of undesirable and/or malicious content (e.g., advertising and/or viruses).

Responsive to the image being verified, the new traits may be added to the Store depository at step 928.

FIG. 9B illustrates provision of learned traits by the cloud store, in accordance with one implementation.

At step 942 of method 940 of FIG. 9C, the Store may receive a user request for an ANN image download. As described above, the request may be based on a purchase, peer-to-peer share, and/or subscription-based service agreement with users of robotic devices.

At step 946, the user request may be validated to determine user authenticity and/or eligibility to obtain the network image. By way of illustration, a fee based subscription may allow for a predetermined number of downloads (e.g., 3) in a time period, so that download requests in excess of the allotted amount may be rejected.

When request is valid, at step 946 the requested data may be provided to the user for download.

Referring now to FIG. 9D, exemplary uses of the network life cycle methodology according to the disclosure are described. In some implementations, the method of FIG. 9D may be used, for example, for operating the robotic apparatus 410 of FIG. 4. The method FIG. 9D may be implemented for example in a robotic device configured for processing of sensory data as described with respect to FIG. 10, infra, thereby advantageously aiding, inter alia, signal compression, and/or object recognition when processing visual sensory input.

Returning now to FIG. 9D, at step 962 of the method 960, a source of the new network configuration may be selected. When the source comprises another robotic device(s), a connection to the device (via, e.g., USB, or a wireless link) may be established. In some implementations, two (or more) robotic devices may be linked via a user computing device (e.g., a desktop, laptop, a smartphone, a tablet, and/or other user computing device).

When the source comprises a cloud depository, a session with the Store may be established.

At step 964, a determination may be made as to whether the download comprises a full image download or an addition of selected traits. By way of illustration, a user a robotic device comprising network partitioned into a visual processing network block and a motor control network block, may desire to add new vision processing functionality, responsive, for example, to a camera upgrade, while leaving the motor functionality unaffected. The users may desire to add selected traits (e.g., ability of the race bot 310 of FIG. 1 to navigate sharp turns on the track 302 of FIG. 3 at higher speeds), thereby preferring partial network updates.

When the full image is to be downloaded, the method 960 may proceed to step 966, where the image type is selected. In some implementations, the image may correspond to the robotic brain image from another robotic device that has been previously trained, described in detail with respect to FIG. 4, supra, while in some implementations, the image may correspond to the network merge described in detail in U.S. Patent Application Ser. No. 61/654,738 entitled "NEURAL NETWORK LEARNING AND COLLABORATION APPARATUS AND METHODS".

When a partial image (e.g., comprising selected traits) is to be downloaded, the method 960 may proceed to step 972, where the individual traits and/or network blocks may be selected for download. Traits from multiple sources (multiple parents) may be selected and combined into a single image download via a network merge described in detail in detail in U.S. Patent Application Ser. No. 61/654,738 entitled "NEURAL NETWORK LEARNING AND COLLABORATION APPARATUS AND METHODS".

At step 974, the download image may be assembled. In some implementations, the assembled image may be configured in accordance with the architecture of the target device, which may be selected at step 968.

At step 968, the target network (e.g., the offspring) may be selected. In one or more implementations, the target may comprise the offspring (e.g., the network of the device being updated/transformed). In some implementations, the target may comprise a network image configured to be stored within a cloud server, and/or downloaded to one or more devices (e.g., the devices 1210 in FIG. 12).

At step 970, the target network configuration may be generated. In one or more implementations, the target configuration may comprise network weights downloaded into the target robotic device. In some implementations, the target configuration may comprise network weights vector stored within the cloud server and available for subsequent downloads to one or more robotic devices (e.g., 1210 of FIG. 12).

In one or more implementations, the methods 920, 940 may enable users to observe trait evolution, purchase, sell, trade traits. In one or more implementations, the methods 920, 940 may be utilized in order to enable users add/remove hardware components of robotic devices (e.g., add/remove sensors, limbs, and/or other components).

In some implementations, the robotic evolution methodology described herein may be effectuated using high level neuromorphic language description (HLND) described in detail in co-pending and co-owned U.S. patent application Ser. No. 13/985,933 entitled "TAG-BASED APPARATUS AND METHODS FOR NEURAL NETWORKS" filed on Jan. 27, 2012, incorporated supra.

Networks of individual robotic devices may be defined in accordance with appropriate HLND, comprising, for example, definition of node number and composition (types), node layout, node interconnections (e.g., the network layout of FIG. 2), and/or other operations. In some implementations, the HLND definition method may comprise one or more of: (1) defining new node types and/or connection types for the new node types, (2) defining a node layout within the network (e.g., how many and/or what type of nodes to create, and how to arrange these nodes within the network that is being created), (3) defining how the nodes connect to one another, and/or other operations. During neural network construction, the above steps 1-3 may be individually and/or sequentially repeated multiple times. In some implementations, the above step 1 may be skipped and pre-defined classes (defining the desired node type) may be used instead in defining the network.

In some implementations, a dedicated software package may be configured to (i) process the HLND statements that define the network and/or (ii) instantiate the network nodes and connections. This processing and/or instantiation may be subject to one or more constraints including (i) only the defined node types and the defined connection types can be instantiated and used in the HLND network definition process, (ii) only the connections between the existing node instances can be instantiated, and/or other constraints. In other words, only connections corresponding to the defined node instances may be used in the HLND process of defining the connections, in accordance with one or more implementations. In some implementations, the dedicated software package may comprise the END engine, which may be configured to generate the END instance of network models, as described in a co-owned U.S. patent application Ser. No. 13/239,123 entitled "ELEMENTARY NETWORK DESCRIPTION FOR NEUROMORPHIC SYSTEMS", incorporated herein by reference in its entirety.

In accordance with some implementations, individual elements of the network (i.e., nodes, extensions, connections, I/O ports) may be assigned at least one unique tag to facilitate the HLND operation and disambiguation. The tags may be used to identify and/or refer to the respective network elements (e.g., a subset of nodes of the network that is within a specified area).

In some implementations, tags may be used to form a dynamic grouping of the nodes so that these dynamically created node groups may be connected with one another. That is, a node group tag may be used to identify a subset of nodes and/or to create new connections within the network. These additional tags may not create new instances of network elements, but may add tags to existing instances so that the additional tags are used to identify the tagged instances.

In some implementations, tags may be used to form a dynamic grouping of the nodes so that these dynamically created node groups may be connected with one another. That is, a node group tag may be used to identify a subset of nodes and/or to create new connections within the network, as described in detail below in connection with FIG. 13. These additional tags may not create new instances of network elements, but may add tags to existing instances so that the additional tags are used to identify the tagged instances.

In some implementations, the HLND file may comprise a set of parameters (subject to design constraints) configured to create different version of the network (different robotic brains). For example, the parameter set may comprise dynamics of a certain class of neurons, parameters describing the relative size of one part of the network versus another, and/or other parameters. Network transformation and merges described above, may utilize these parameters. In some implementations, the user may select which parameters may be subject to mutations (e.g., random operations) and/or cross-transformations, and mutate/cross and which parameters may be selected directly from each of the parents. This functionality may enable breeders (e.g., users and/or business operators) to constrain the variation process to parameters that he finds interesting and/or relevant.

In some implementations, the state of the HLND definition of new robotic 'species' may be monitored in order to detect, for example, the HLND file changes that may become incompatible with the robot software and/or hardware configuration. For example, when selecting network sub-populations based on tags and/or unit locations from two or more parents in a joint merge, the number of selected units may exceed the target hardware capacity so that information related some of the units may become lost thereby corrupting operation of the offspring.

In another aspect of the disclosure a business method of operating a brain depository (e.g., Brain App Store) is disclosed. The Brain App Store may comprise cloud depository 1206 described with respect to FIG. 12. The depository 1206 may enable uses of various learning robotic devices to buy, sell, trade, exchange robotic brains, bodies, and/or body parts. In one implementation, robots provided by robot manufacture(s) may comprise some basic functionality and may learn additional functions. Some power users (e.g., parents and/or guardians) may subscribe to the "Artificial Evolution" AppStore. Users (e.g., children) may train the robots. When the users are not satisfied with the traits and/or behaviors of their robots they may choose to transform robotic brains using any of the applicable methodologies described herein. By way of illustration, a user may mutate their own robot brain with a robot brain from the AppStore that has sufficiently high score. Users who are satisfied with their robot, may assign score grade to their creatures, so that other users may use the grade when generating an offspring from this robot brain. The more time users spend with their robot (e.g., the more time he spends teaching the robot new tricks), the higher the f score of this robot may be. Accordingly, robots with higher score grades may result in more progeny for the robot. In some implementations, the hardware configuration of the robot remains unchanged and all evolutionary changes are effectuated via the brain software.

In one or more implementations, users may acquire (and/or replace) components of the robotic platform (e.g., legs, sensors, manipulators, actuators, communication devices, embellishments, and or other parts). Users may construct custom appendages for use with the robotic platform. Brain AppStore may enable such users to enable control functionality of their upgraded robotic devices by, for example, downloading a robotic brain suitable for hardware the modification.

The present disclosure further pertains to users of robotic devices ability to share content related to the training of such robotic devices. In various implementations, a user may extract the state of a neural network (or other useful training-related information) directly from the device. Thus, the artificial mind and its traits may be copied, stored, and later retrieved, as described in detail with respect to FIG. 12 below. This state information may be shared with other users. Consistent with the present disclosure, a user may download such stored state information (whether from networked or cloud storage, or in a peer-to-peer (P2P) fashion) and apply it to a second neural network, effectively duplicating the first neural network, or alternatively enabling macro-level heterogeneous plasticity (i.e., obviating the second neural device from having to "learn the lessons" learned by the first neural device).

Processes and architectures for sharing such state information among a plurality of users are disclosed as well. In some implementations, such as illustrated in FIG. 12, a cloud-based repository 1200 of robotic device "brain images" (e.g., neural network state information) may be introduced. The depository may comprise cloud server depository 1206. In FIG. 6, one or more remote user devices 1210 may connect via a remote link 1214 to the depository 1206 in order to save, load, update, and/or perform other operations associated with their network configuration. The one or more remote user devices may interface with a local user computerized device 1204 via a local link 1208 in order to facilitate learning configuration and software maintenance of the user device 1210. In one or more implementations, the local link 1208 may comprise a network (Ethernet), wireless (e.g. Wi-Fi, Bluetooth, infrared, radio), serial link (USB, Firewire), and/or other link. The local computerized device 1204 may communicate with the cloud server depository 1206 via link 1212. In one or more implementations, links 1212 and/or 1214 may comprise an internet connection, etc. effectuated via any of the applicable wired and/or wireless technologies (e.g., Ethernet, WiFi, LTE, CDMA, GSM, and/or other technology).

The connectivity structure of the exemplary computerized neuromorphic apparatus 1150, the user interface device 1202, and the cloud server 1206, described with respect to FIGS. 11C and 12, respectively, below, may be configured to aid in fostering a social environment in which the computerized neuromorphic apparatus 1150 are trained. Through options in the training application, users may access content shared by other users. This content may include media related to the training of the computerized neuromorphic apparatus 1150 (e.g. videos, pictures, collected sensor data, wiki entries on training techniques/experiences, forum posts, and/or other information), brain images, third-party/homebrew modifications, and/or other information. Users may form user groups to collaborate on projects and/or focus on specific topics the collective formation of a brain image (somewhat akin to extant distributed gaming interaction). In some implementations, user may also cross-link to groups and content on third-party social media websites and/or services (e.g. Facebook®, Twitter®, and/or other social media websites and/or services).

Referring now to FIG. 6, a functional block diagram of a robotic apparatus 620 consistent with the present disclosure is shown. The robotic apparatus may include a robotic brain 622 for control of the device. Additional memory 624 and processing capacity 626 may be available for other hardware/firmware/software needs of the robotic device. In some implementations, the robotic brain 712 may interface with the mechanical 628, sensory 630, electrical 632, power components 634, network interface 636, and/or other components via driver interfaces and/or software abstraction layers. Thus, additional processing and memory capacity may be used to support these processes. However, it will be appreciated that these components may be fully controlled by the robotic brain. The memory and processing capacity may also aid in brain image management for the robotic device, which may include one or more of loading, replacement, initial startup, and/or other operations. The various components of the device may be remotely disposed from one another, and/or aggregated. For example, the robotic brain may be executed on a server apparatus, and control the mechanical components via network or radio connection while memory or storage capacity may be integrated into the brain. Multiple mechanical, sensory, and/or electrical units may be controlled be a single robotic brain via network/radio connectivity.

In one or more implementations, functionality of the robotic device 620 may be evaluated and/or simulated using a computerized simulation environment (sandbox), such as, for example a spiking neuron network configured using HLND framework described supra. The disembodied brain may be referred to as the "brain in a box".

The mechanical components 628 may include virtually any type of device configured to move and/or perform a desired function or task. These may include, for example, one or more of motors, servos, pumps, hydraulics, pneumatics, stepper motors, rotational plates, micro-electro-mechanical devices (MEMS), electroactive polymers, and/or other devices. The devices may interface with the robotic brain and enable physical interaction and manipulation of the device.

The sensory devices 630 may allow the robotic device to accept stimulus from external entities. These may include, for example, one or more of video, audio, haptic, capacitive, radio, vibrational, ultrasonic, infrared, and temperature sensors radar, lidar and/or sonar, and/or other stimuli. The processing associated with sensory information is discussed below with respect to FIG. 10.

The electrical components 632 may include virtually any electrical device for interaction and manipulation of the outside world. This may include, for example, one or more of light/radiation generating devices (e.g. LEDs, IR sources, light bulbs, and/or other light/radiation generating devices), audio devices, monitors/displays, switches, heaters, coolers, ultrasound transducers, lasers, and/or other electrical devices. Individual ones of these devices may enable a wide array of applications for the robotic apparatus in industrial, hobbyist, building management, medical device, military/intelligence, and other fields (as discussed below).

The network interface may include one or more connections to external computerized devices to allow for, inter alia, management of the robotic device. The connections may include any of the wireless or wireline interfaces discussed above, and/or may include customized or proprietary connections for specific applications.

The power system 634 may be configured based on the needs of the application of the device. For example, for a small hobbyist robot, a wireless power solution (e.g. battery, solar cell, inductive (contactless) power source, rectification, and/or other power solution) may be appropriate. However, for building management applications, battery backup/direct wall power may be included. In an autonomous robotic devices various power sources may be utilized including accumulators, fuel cells, radioisotope thermoelectric generator (RTG), internal and/or external heat source and/or other power generators. In some implementations, the power system may be adaptable with respect to the training of the robotic apparatus 620. Thus, the robotic may improve its efficiency (to include power consumption efficiency) through learned management techniques specifically tailored to the tasks performed by the robotic apparatus. In some implementations, the robotic device may learn to locate and utilize available external power sources (e.g., locate and use an AC outlet to recharge internal batteries).

Figure 13A:
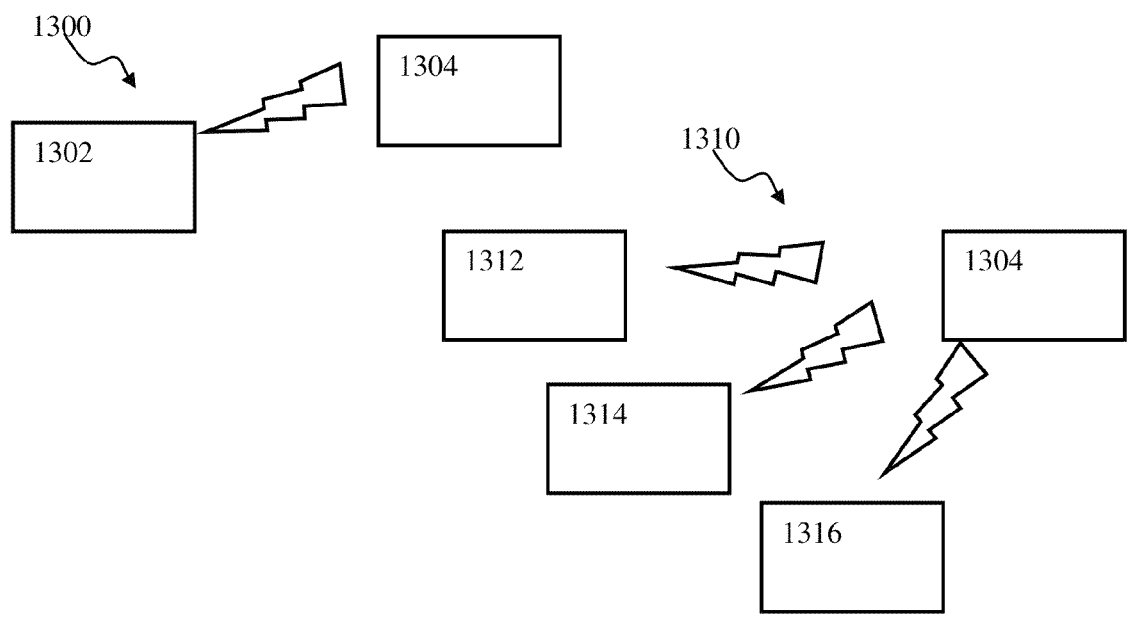
FIG. 13A is a functional block diagram illustrating control of a robot by a remote robotic brain in accordance with one or more implementations.

In one or more implementations, such as illustrated in FIG. 13A, the robotic apparatus 1300 may comprise a robotic brain 1302 that is remote from the robotic hardware platform (e.g., a rover). The robotic brain 1302 may control the rover via a wireless communications link. In one implementation, such as the apparatus 1310 in FIG. 13A, the remote brain may comprise multiple remote brains (distributed brain). The remote brains 1312, 1314, 1316 may control the hardware platform 1304 remotely. In some implementations, the remote brains 1312, 1314, 1316 may communicate with one another (not shown).

Figure 13B:
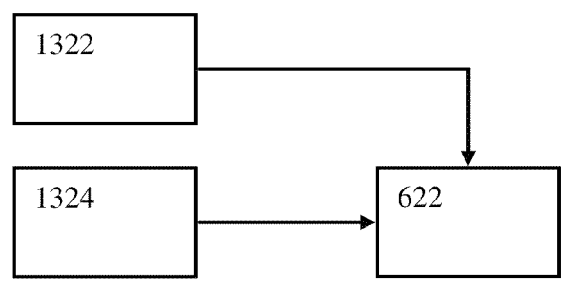
FIG. 13B is a functional block diagram illustrating brain generation based on two sources (brain merge) in accordance with one implementation.

In one or more implementations, such as illustrated in FIG. 13B, the robotic brain (e.g., the brain 622) may be assembled using two or more parent brains 1322, 1324.

Figure 10:
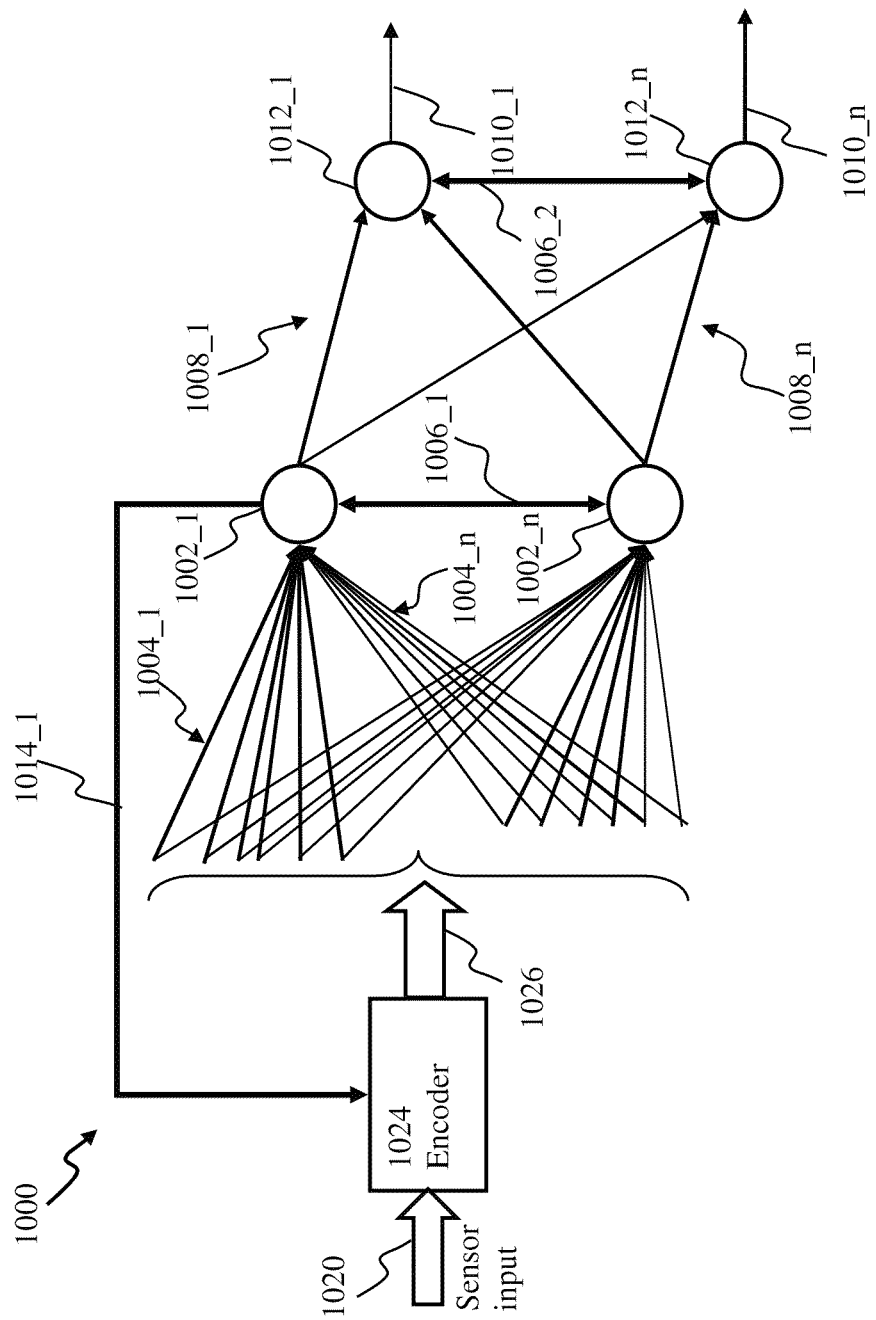
FIG. 10 is a block diagram illustrating sensory processing apparatus configured to implement detection of salient features, in accordance with one implementation.

One exemplary apparatus for processing of sensory information (e.g., visual, audio, and/or somatosensory) useful in an autonomous robotic device, is shown in FIG. 10. The illustrated processing apparatus 1000 may comprise an input interface configured to receive an input sensory signal 1020. In some implementations, this sensory input may comprise electromagnetic waves (e.g., visible light, IR, UV, and/or other wavelength ranges) entering an imaging sensor array (comprising RGCs, a charge coupled device (CCD), or an active-pixel sensor (APS)). The input signal may be a sequence of images (image frames) received from a CCD camera via a receiver apparatus, or downloaded from a file. The image may be a two-dimensional matrix of RGB values refreshed at a 24 Hz frame rate. It will be appreciated by those skilled in the art that the above image parameters are merely exemplary, and many other image representations (e.g., bitmap, CMYK, grayscale, and/or other representations) and/or frame rates are equally useful with the present disclosure.

The apparatus 1000 may comprise an encoder 1024 configured to transform (encodes) the input signal into an encoded signal 1026. In some implementations, the encoded signal may comprise or convey information associated with a plurality of pulses (also referred to as a group of pulses) configured to model neuron behavior. The encoded signal 1026 may be communicated from the encoder 1024 via multiple connections (also referred to as transmission channels, communication channels, or synaptic connections) 1004 to one or more neuronal nodes (also referred to as the detectors) 1002.

In the implementation of FIG. 10, different detectors of the same hierarchical layer are denoted by an "_n" designator, such that e.g., the designator 1002_1 denotes the first detector of the layer 1002. Although only two detectors (1002_1, 1002_n) are shown in the implementation of FIG. 10 for clarity, it is appreciated that the encoder can be coupled to any number of detector nodes that is compatible with the detection apparatus hardware and software limitations. A single detector node may be coupled to any practical number of encoders.

In some implementations, individual ones of the detectors 1002_1, 1002_n may include logic (which may be implemented as a software code, hardware logic, or a combination of thereof) configured to recognize a predetermined pattern of pulses in the encoded signal 1004, using for example any of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce post-synaptic detection signals transmitted over communication channels 1008. In FIG. 10, the designators 1008_1, 1008_n denote output of the detectors 1002_1, 1002_n, respectively.

In some implementations, the detection signals may be delivered to a next layer of the detectors 1012 (comprising detectors 1012_1, 1012_m, 1012_k) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this implementation, individual subsequent layers of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling alphabet recognition by the apparatus.

Individual ones of the detectors 1002 may output detection (post-synaptic) signals on communication channels 1008_1, 1008_n (with appropriate latency) that may propagate with different conduction delays to the detectors 1012. The detector cascade of the implementation of FIG. 10 may contain any practical number of detector nodes and detector banks determined, inter alia, by the software/hardware resources of the detection apparatus and complexity of the objects being detected.

The sensory processing apparatus implementation illustrated in FIG. 10 may comprise lateral connections 1006. In some implementations, the connections 1006 may be configured to communicate post-synaptic activity indications between neighboring neurons of the same hierarchy level, as illustrated by the connection 1006_1 in FIG. 10.

In some implementations, the apparatus 1000 may comprise feedback connections 1014 configured to communicate context information from detectors within one hierarchy layer to one or more previous layers, as illustrated by the feedback connections 1014_1 in FIG. 10. In some implementations, the feedback connection 1014_2 may be configured to provide feedback to the encoder 1024 to facilitate sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Figure 11A:
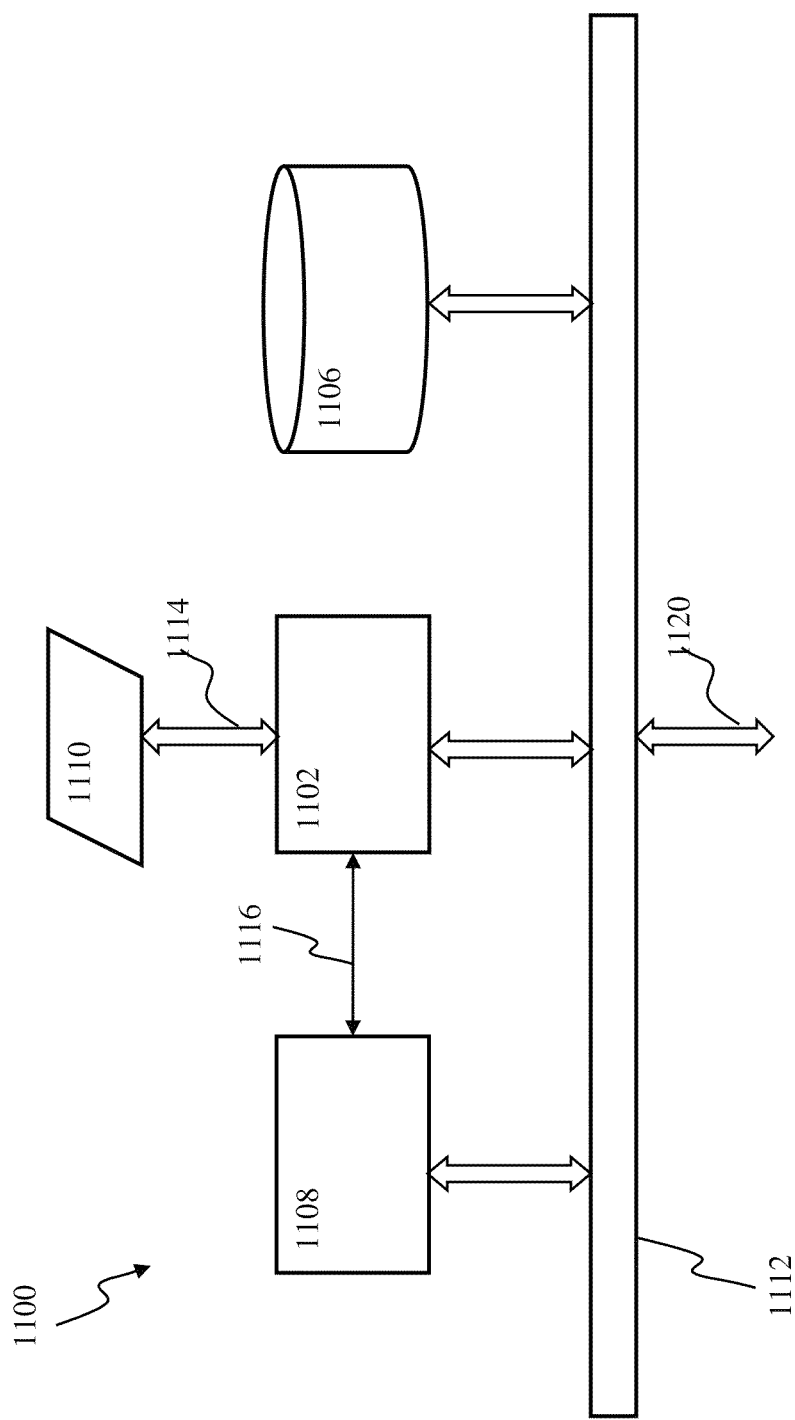
FIG. 11A is a block diagram illustrating computerized system useful for implementing logic of an autonomous robotic device, in accordance with one or more implementations.

One exemplary implementation of the computerized neuromorphic processing system, for operating a computerized spiking network (and implementing the exemplary sensory processing methodology described supra), is illustrated in FIG. 11A. The computerized system 1100 of FIG. 11A may comprise an input device 1110, such as, for example, an image sensor and/or digital image interface. The input interface 1110 may be coupled to the processing block (e.g., a single or multi-processor block) via the input communication interface 1114. In some implementations, the interface 1114 may comprise a wireless interface (cellular wireless, Wi-Fi, Bluetooth, and/or other wireless interface) that enables data transfer to the processor 1102 from remote I/O interface 1100, e.g. One such implementation may comprise a central processing apparatus coupled to one or more remote camera devices comprising salient feature detection apparatus of the disclosure.

The system 1100 may comprise a random access memory (RAM) 1108, configured to store neuronal states and connection parameters and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra In some implementations, the memory 1108 may be coupled to the processor 1102 via a direct connection (memory bus) 1116, via a high-speed processor bus 1112, and/or via some other connection. In some implementations, the memory 1108 may be embodied within the processor block 1102.

The system 1100 may comprise a nonvolatile storage device 1106, comprising, inter alia, computer readable instructions configured to implement various aspects of spiking neuronal network operation (e.g., sensory input encoding, connection plasticity, operation model of neurons, and/or other aspects). In one or more implementations, the nonvolatile storage 1106 may be used to store state information of the neurons and connections when, for example, saving/loading network state snapshot, or implementing context switching (e.g., saving current network configuration (comprising, inter alia, connection weights and update rules, neuronal states and learning rules, etc.) for later use and loading previously stored network configuration.

In some implementations, the computerized apparatus 1100 may be coupled to one or more external processing/storage/input devices via an I/O interface 1120, such as a computer I/O bus (PCI-E), wired (e.g., Ethernet) or wireless (e.g., Wi-Fi) network connection.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces may be applicable to one or more implementations including, for example, an LCD/LED monitor, touch-screen input and display device, speech input device, stylus, light pen, trackball, and/or other input/output interfaces.

Figure 11B:
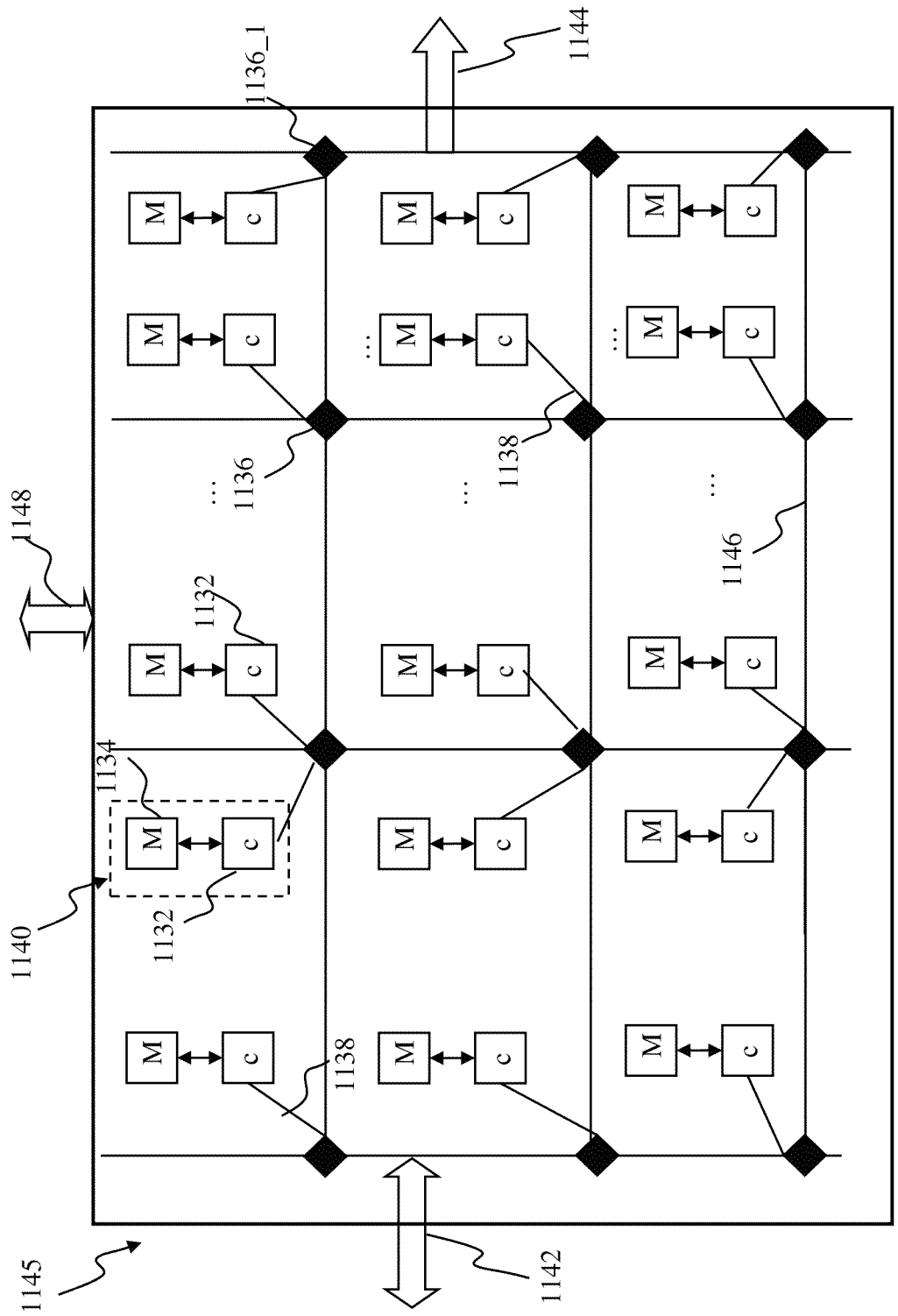
FIG. 11B is a block diagram illustrating grid-type neuromorphic computerized system useful for system useful for implementing logic of an autonomous robotic device in accordance with one or more implementations.

FIG. 11B, illustrates one implementation of neuromorphic computerized system configured for use with salient feature detection apparatus described supra. The neuromorphic processing system 1130 of FIG. 11B may comprise a plurality of processing blocks (micro-blocks) 1140, where individual micro cores may comprise logic block 1132 and memory block 1134, denoted by 'L' and 'M' rectangles, respectively, in FIG. 11B. The logic block 1132 may be configured to implement various aspects of salient feature detection, such as the latency encoding described in detail in co-owned U.S. patent application Ser. No. 13/548,071, entitled "SPIKING NEURON NETWORK SENSORY PROCESSING APPARATUS AND METHODS", filed Jul. 12, 2012, incorporated herein in its entirety, neuron unit dynamic model, detector nodes 1022 if FIG. 10A, and/or inhibitory nodes 1029 of FIG. 10A. The logic block may implement connection updates (e.g., the connections 1014, 1026 in FIG. 10A) and/or other tasks relevant to network operation. In some implementations, the update rules may comprise rules spike time dependent plasticity (STDP) updates. The memory block 1024 may be configured to store, inter alia, neuronal state variables and connection parameters (e.g., weights, delays, I/O mapping) of connections 1138.

One or more micro-blocks 1140 may be interconnected via connections 1138 and routers 1136. In one or more implementations (not shown), the router 1136 may be embodied within the micro-block 1140. As it is appreciated by those skilled in the arts, the connection layout in FIG. 11B is exemplary and many other connection implementations (e.g., one to all, all to all, and/or other connection implementations) may be compatible with the disclosure.

The neuromorphic apparatus 1130 may be configured to receive input (e.g., visual input) via the interface 1142. One or more implementations may be applicable, for example, to interfacing with a pixel array. The apparatus 1130 may provide feedback information via the interface 1142 to facilitate encoding of the input signal.

The neuromorphic apparatus 1130 may be configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). In one or more implementations, the apparatus 1130 may interface to external slower memory (e.g., flash, or magnetic (hard drive)) via lower bandwidth memory interface 1146, in order to facilitate program loading, operational mode changes, and retargeting, where network node and connection information for a current task may be saved for future use and flushed, and previously stored network configuration may be loaded in its place, as described for example in co-pending and co-owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety.

Figure 11C:
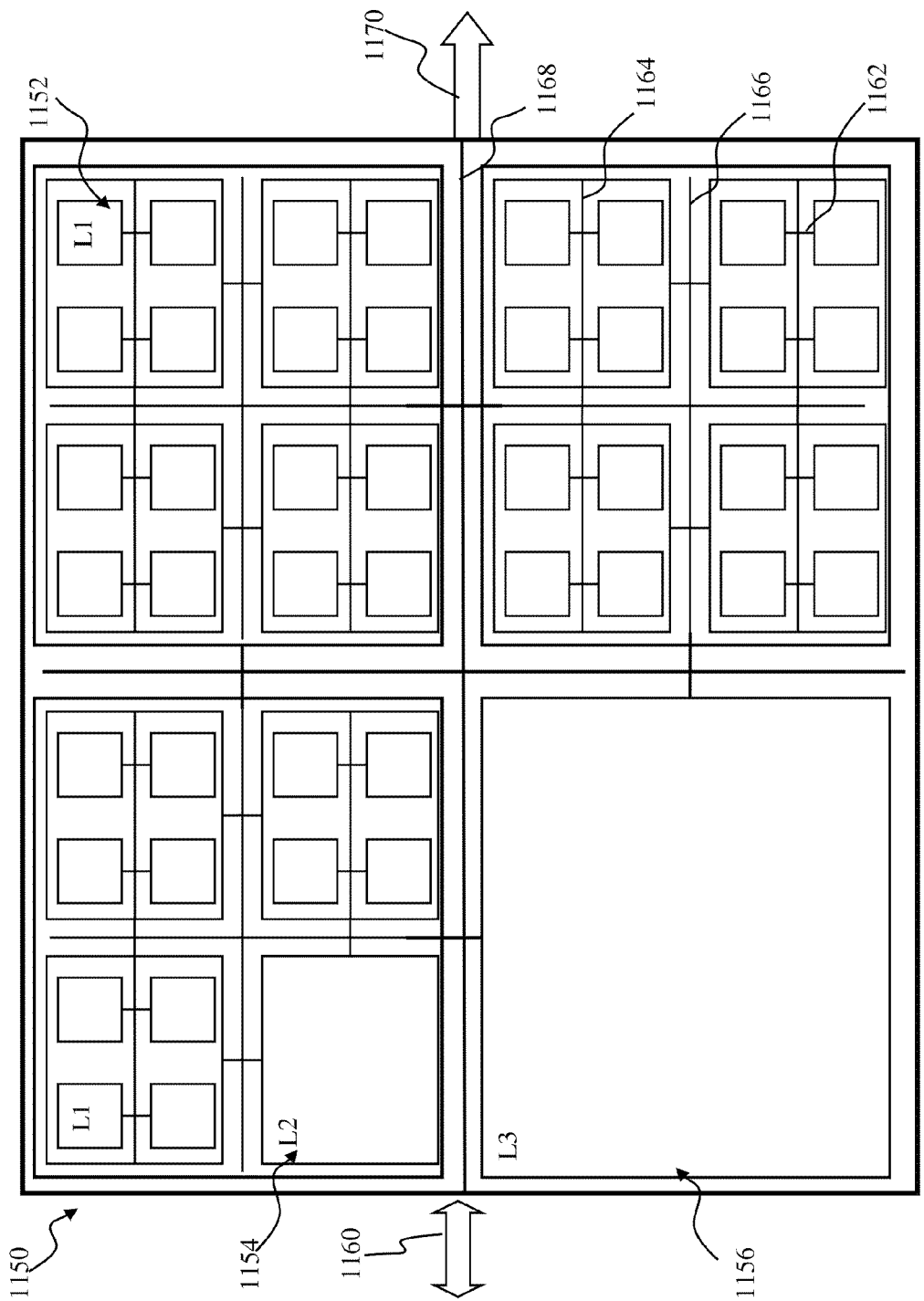
FIG. 11C is a block diagram illustrating hierarchical neuromorphic computerized system architecture useful for system useful for implementing logic of an autonomous robotic device in accordance with one or more implementations.

FIG. 11C illustrates one implementation of cell-based hierarchical neuromorphic system architecture configured to implement salient feature detection. The neuromorphic system 1150 of FIG. 11C may comprise a hierarchy of processing blocks (cells block) 1140. In some implementations, the lowest level L1 cell 1152 of the apparatus 1150 may comprise logic and memory and may be configured similar to the micro block 1140 of the apparatus shown in FIG. 11B, supra. A number of cell blocks 1052 may be arranged in a cluster 1154 and communicate with one another via local interconnects 1162, 1164. Individual ones of such clusters may form higher level cell, e.g., cell denoted L2 in FIG. 11C. Similarly several L2 level clusters may communicate with one another via a second level interconnect 1166 and form a super-cluster L3, denoted as 1156 in FIG. 11C. The super-clusters 1156 may communicate via a third level interconnect 1168 and may form a higher-level cluster, and so on. It will be appreciated by those skilled in the arts that hierarchical structure of the apparatus 1150, comprising four cells-per-level, shown in FIG. 11C represents one exemplary implementation and other implementations may comprise more or fewer cells/level and/or fewer or more levels.

Different cell levels (e.g., L1, L2, L3) of the apparatus 1150 may be configured to perform functionality various levels of complexity. In one implementation, different L1 cells may process in parallel different portions of the visual input (e.g., encode different frame macro-blocks), with the L2, L3 cells performing progressively higher level functionality (e.g., edge detection, object detection). Different L2, L3, cells may perform different aspects of operating as well, for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive visual input (e.g., the input 1002 in FIG. 10) via the interface 1160. In one or more implementations, applicable for example to interfacing with a latency encoder and/or an image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (e.g., the I/O 1160 of FIG. 11C).

The apparatus 1150, in one or more implementations, may interface to external fast response memory (e.g., RAM) via high bandwidth memory interface (not shown) to facilitate storage of intermediate network operational parameters (e.g., spike timing and/or other parameters). The apparatus 1150 may interface to a larger external memory (e.g., flash, or magnetic (hard drive)) via a lower bandwidth memory interface (not shown) to facilitate one or more of program loading, operational mode changes, and/or retargeting, where network node and connection information for a current task may be saved for future use and flushed, and previously stored network configuration may be loaded in its place, as described for example in co-pending and co-owned U.S. patent application Ser. No. 13/487,576, entitled "DYNAMICALLY RECONFIGURABLE STOCHASTIC LEARNING APPARATUS AND METHODS", incorporated supra.

Various aspects of the present disclosure may be applied to, inter alia, training and artificial evolution of artificial robotic brains.

In some implementations, artificial evolution described herein may provide entertainment and/or educational value to users by, inter alia, offering users a participation in robotic brain generation process.

Artificial robotic brain evolution may allow for generation of more capable brains in a shorter amount of time via network merged. By way of example, a visual proceeding network selected by a user group A (adjudged as the highest performing, for example, by an object recognition success rate) may be merged with a camera motor control network, selected (concurrently) by a separate user group B, thereby generating a combined network (A+B) that is configured for more precise and robust camera position control and visual processing. Cloud and/or peer-to-peer connectivity may enable one (or both) these groups (A,B) to perform their selection work in a distributed manner without necessitating them being co-located.

In some implementations, the robotic evolution may comprise hybridization between a robot A with a robot B. In some implementations, the robot A may be selected by agent group A. Such selection may be based on a higher repertoire of motor actions. The robot B may be selected by agent group B. This selection may be based on better action selection. In some implementations, the robot A may be selected for being able to open doors. In some implementations, the robot B may be selected for being able to climb stairs. In some implementations, the offspring of the hybridization may be used in structural and/or high-rise firefighting.

User selection may facilitate propagation of desired traits (e.g., the fastest race bot that is configured to navigate a 270 deg turn on the trace track). Similarly, undesired traits may be rapidly eliminated (e.g., by re-setting weights of the respective block) thereby producing better performing brains (fewer errors), preventing propagation of poor performance; and/or allowing the freed network capacity (neurons and/or connections) be utilized for other tasks.

Artificial evolution that employs crowdsourcing (via, for example, a cloud depository) may afford an exponential improvement in learning speed and mutation success.

The cloud store may enable users and/or business entities to generate income by providing and/or enabling users to share trained robotic brains. Various business models may be employed such as, subscription, pay-per use, trade for cash and/or credits (points), barter, and/or others. Accordingly, users who spend their time training and/or selecting robotic brains may receive (monetary in some implementations) reward by offering their robotic brain product to other users. In some implementations, the reward may be other than monetary, such as for example, recognition by peers (best racer of a group) and/or institution (best robot at school).

One or more implementations may be applicable to training coordinated operations of automated devices. For example, in applications such as unexploded ordinance/improvised explosive device location and removal, a coordinated search pattern between multiple autonomous learning devices may lead to more efficient area coverage. Learning devices may offer the flexibility to handle wider (and dynamic) variety of explosive device encounters. Such learning devices may be easily trained to identify targets (e.g. enemy vehicles) and deliver similar explosives.

It will be recognized that while certain aspects of the innovation are described in terms of a specific sequence of steps of a method, these descriptions are only illustrative of the broader methods of the innovation, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the innovation disclosed and claimed herein.

While the above detailed description has shown, described, and pointed out novel features of the innovation as applied to various implementations, it will be understood that various omissions, substitutions, and changes in the form and details of the device or process illustrated may be made by those skilled in the art without departing from the innovation. The foregoing description is of the best mode presently contemplated of carrying out the innovation. This description is in no way meant to be limiting, but rather should be taken as illustrative of the general principles of the innovation. The scope of the innovation should be determined with reference to the claims.

What is claimed:
1. A robotic apparatus, comprising:
one or more processors configured to execute computer program modules, the computer program modules being executable to effectuate a neural network, the neural network being characterized by a configuration vector, the configuration vector comprising a combination of at least a portion of a first parent vector and at least a portion of second parent vector;

wherein:

the first parent vector is based on an operation of a first neural network of a first parent in accordance with a learning process, the operation of the first neural network being characterized by a first network configuration vector configured based on the first parent achieving a first task;

the second parent vector is based on an operation of a second neural network of a second parent in accordance with a learning process, the operation of the second network being characterized by a second network configuration vector configured based on the second parent achieving a second task; and the combination is based on a selection received from at least one agent responsive to the first parent achieving the first task and the second parent achieving the second task, the selection being indicative of the first neural network and the second neural network.

2. The apparatus of claim 1, wherein the configuration vector comprises a plurality of weights associated with synaptic connections of the neural network.

3. The apparatus of claim 1, wherein individual weights associated of the configuration vector are based on a linear combination of individual weights of the first parent vector and individual weights of the second parent vector.

4. The apparatus of claim 3, wherein the combination comprises a random operation configured to introduce a random component into individual weights of the configuration vector.

5. A computer-implemented method of operating a robotic apparatus comprising network of a plurality of spiking neurons, the method being performed by one or more processors configured to execute computer program modules, the method comprising:

operating the network in accordance with a learning process configured to cause the apparatus to perform a task, the operating being characterized by a network state information; and based on a completion of the task, transferring at least a portion of the network state information to another robotic apparatus;

wherein the transferring is configured to enable the other robotic apparatus to perform the task.

6. The method of claim 5, wherein:

the network comprises a plurality of connections configured to communicate spikes between the plurality of neurons, individual ones of the plurality of connections being characterized by connection weight; and the operating network in accordance with the learning process comprises adjusting one or more of the connection weights in accordance with a connection plasticity mechanism.

7. The method of claim 6, wherein:

the completion of the task by the robotic apparatus is characterized by an outcome having a performance value associated therewith, the outcome being associated with a desired network state;

the adjusting the one or more of the connection weights is configured to transition present network state to the desired network state; and the present network state having a present performance value associated therewith, the present performance value being lower than the performance value.

8. The method of claim 7, wherein:

the other robotic apparatus comprises another spiking network configured to operate in accordance with the learning process, characterized by another present performance value; and the enabling of the other robotic apparatus to perform the task is characterized by the other network attaining another target performance that is greater than the other present performance.

9. The method of claim 8, wherein:

the performance value is within an range of performance values;

the other robotic apparatus comprises another spiking network configured to operate in accordance with the learning process; and the enabling of the other robotic apparatus to perform the task is characterized by the other network attaining another target performance that is within the established range.

10. The method of claim 9, wherein:

the portion of the network state information comprises a vector comprising a plurality of weights of individual ones of the plurality of connections;

the other network comprises another plurality of connections characterized by another vector of connection weights; and the transferring is configured to replicate the at least a portion of the vector within the other vector without relying on individual adjustment of weights of the other vector by the learning process.

11. The method of claim 10, wherein the transferring is configured to copy the vector into the other vector.

12. The method of claim 10, wherein:

the transferring is configured to apply a mathematical transformation to individual elements of the vector to obtain the transformed vector; and the other vector comprises the transformed vector.

13. The method of claim 10, wherein the transformation comprises a random operation configured to introduce a random component to individual weight elements of the vector.

14. A computer-implemented method of updating a state of a neural network device, the method being performed by one or more processors configured to execute computer program modules, the method comprising:

establishing a data connection to a cloud server apparatus;

facilitating browsing of a plurality of state files via a user interface, the state files being stored on the cloud server apparatus;

receiving a selection of an individual one of the plurality of state files;

establishing a second data connection to the neural network device; and causing the extraction and application of a state by the neural network device, the state being described at least in part by the individual one of the plurality of state files.

15. A computer-implemented method of updating a state of a neural network device, the method being performed by one or more processors configured to execute computer program modules, the method comprising:

observing operation of two or more neural network devices, the operation having a selection threshold associated therewith;

responsive to performance of another neural network device of the two more neural network devices being above the threshold, reproducing a configuration of the other neural network device by transferring at least a portion of neural network image of the other neural network device into the neural network device; and responsive to performance of another neural network device of the two more neural network devices being below the threshold, preventing reproduction of the configuration of the other neural network device.

16. The method of claim 15, wherein:

the selection threshold is associated with completion of a task by the other neural network device;

the performance being above the threshold is based on a completion of the task; and the performance being below the threshold is based on an unsuccessful attempt to complete the task.

17. The method of claim 15, wherein individual ones of the two or more neural network devices comprise autonomous racing robotic apparatus;

the task comprises a race between the autonomous racing robotic apparatus absent user intervention; and the selection threshold comprises winning the race.

18. The method of claim 15, wherein the configuration of the other neural network comprises a plurality of weights; and the operation of the of two or more neural network devices comprises learning adaptation of individual ones of the plurality of weights.

19. The method of claim 15, wherein the configuration of the other neural network device comprises one or more high-level neuromorphic description instructions configured to be executed by the two or more neural network devices;

the observing comprises comparing the one or more high-level neuromorphic description instructions to a template;

the reproducing the configuration is based on the one or more high-level neuromorphic description instructions matching a portion of the template; and the preventing reproduction is based on the one or more high-level neuromorphic description instructions deviating by an established measure from the template.

20. A cloud server system, comprising:

a storage apparatus configured to store a plurality of neuromorphic apparatus state data;

a network interface configured to receive one or more subscriber requests, the one or more subscriber requests including a first subscriber request; and one or more processors configured to execute computer program modules, individual ones of the one or more processors being communicatively coupled with the storage apparatus and the network interface, the computer program modules being executable to perform a method to facilitate a business transaction, the method comprising:

authenticating a subscriber accessing the cloud server system via a user interface device;

receiving the first subscriber request from the subscriber, the first subscriber request being for one or more of the plurality of neuromorphic apparatus state data;

determining whether the subscriber is authorized to receive the one or more of the plurality of neuromorphic apparatus state data; and based on the determination, effectuating the business transaction by transmitting the one or more of the plurality of neuromorphic apparatus state data to one or both of: (i) a neuromorphic apparatus associated with the subscriber or (ii) the user interface device.

* * * * *